US011425782B2

(12) United States Patent
Choi et al.

(10) Patent No.: US 11,425,782 B2
(45) Date of Patent: Aug. 23, 2022

(54) ELECTRONIC DEVICE FOR SUPPORTING DUAL CONNECTIVITY AND METHOD FOR OPERATING THEREOF

(71) Applicant: Samsung Electronics Co., Ltd., Suwon-si (KR)

(72) Inventors: Untaek Choi, Suwon-si (KR); Junsuk Kim, Suwon-si (KR); Wonsuk Chung, Suwon-si (KR); Sangho Lee, Suwon-si (KR); Suyoung Park, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 16/875,569

(22) Filed: May 15, 2020

(65) Prior Publication Data

US 2020/0367311 A1 Nov. 19, 2020

(30) Foreign Application Priority Data

May 17, 2019 (KR) .................. 10-2019-0058131
Jun. 5, 2019 (KR) .................. 10-2019-0066935

(51) Int. Cl.
*H04W 76/28* (2018.01)
*H04W 76/16* (2018.01)
(Continued)

(52) U.S. Cl.
CPC .......... *H04W 76/28* (2018.02); *H04W 76/16* (2018.02); *H04W 80/02* (2013.01); *H04W 88/06* (2013.01)

(58) Field of Classification Search
CPC ..... H04W 76/28; H04W 76/16; H04W 80/02; H04W 88/06
See application file for complete search history.

(56) References Cited

U.S. PATENT DOCUMENTS

2015/0271750 A1 9/2015 Jung et al.
2016/0255583 A1 9/2016 Takeda et al.
(Continued)

FOREIGN PATENT DOCUMENTS

KR 10-2010-0009493 A 1/2010
KR 10-2016-0128876 A 11/2016
(Continued)

OTHER PUBLICATIONS

International Search Report and Written Opinion of the International Searching Authority in connection with International Application No. PCT/KR2020/005619 dated Jul. 30, 2020, 7 pages.
(Continued)

*Primary Examiner* — Will W Lin

(57) ABSTRACT

An electronic device according to various embodiments includes: a first communication processor configured to support first network communication with a first network; and a second communication processor configured to support second network communication with a second network different from the first network, wherein, when the first network communication and the second network communication are configured to be in a state of enabling data transmission, the second communication processor is configured to transmit transmission data based on the second network communication while the first communication processor is in a CDRX state and to transmit information indicating transmission of the transmission data to the first communication processor, and the first communication processor is configured to switch from the CDRX state to an active state based on acquisition of the information indicating transmission of the transmission data from the second communication processor and to transmit data different from the transmission data.

19 Claims, 19 Drawing Sheets

(51) Int. Cl.
*H04W 80/02* (2009.01)
*H04W 88/06* (2009.01)

(56) References Cited

U.S. PATENT DOCUMENTS

| | | |
|---|---|---|
| 2016/0323823 A1 | 11/2016 | Ryoo et al. |
| 2018/0352603 A1 | 12/2018 | Jha et al. |
| 2019/0021052 A1* | 1/2019 | Kadiri ................... H04W 76/27 |
| 2019/0053162 A1* | 2/2019 | Islam ................... H04W 72/042 |
| 2019/0082439 A1 | 3/2019 | Krishnamoorthy et al. |
| 2019/0254100 A1* | 8/2019 | Yu ........................ H04W 76/18 |
| 2019/0281653 A1* | 9/2019 | Berggren ............... H04W 76/28 |
| 2020/0245395 A1* | 7/2020 | Zhang ................... H04L 5/0053 |
| 2020/0267605 A1 | 8/2020 | Bae et al. |
| 2021/0385710 A1* | 12/2021 | Jin ........................ H04W 48/12 |

FOREIGN PATENT DOCUMENTS

| | | |
|---|---|---|
| KR | 10-2019-0027624 A | 3/2019 |
| WO | 2013143051 A1 | 10/2013 |
| WO | 2017/127126 A1 | 7/2017 |

OTHER PUBLICATIONS

3GPP TS 36.321 V15.5.0 (Mar. 2019), Technical Specification, 3rd Generation Partnership Project; Technical Specification Group Radio Access Network; Evolved Universal Terrestrial Radio Access (E-UTRA); Medium Access Control (MAC) protocol specification (Release 15), Mar. 2019, 131 pages.

* cited by examiner

ELECTRONIC DEVICE FOR SUPPORTING DUAL CONNECTIVITY AND METHOD FOR OPERATING THEREOF

CROSS-REFERENCE TO RELATED APPLICATIONS

This application is based on and claims priority under 35 U.S.C. 119 to Korean Patent Application No. 10-2019-0058131 filed on May 17, 2019 and Korean Patent Application No. 10-2019-0066935 filed Jun. 5, 2019 in the Korean Intellectual Property Office, the disclosures of which are herein incorporated by reference in their entirety.

BACKGROUND

1. Field

Various embodiments of the disclosure relate to an electronic device supporting dual connectivity and a method of operating the same.

2. Description of Related Art

Recently, with the development of mobile communication technology, the use of portable terminals having various functions has become common, and efforts have been made to develop 5G communication systems to meet the increasing demand for wireless data traffic. In order to achieve high data rates, 5G communication systems are being considered for implementation in ultra high frequency bands in addition to high frequency bands used in 3G and LTE.

As a method of implementing 5G communication, a standalone (SA) method and a non-standalone (NSA) method are being considered. Of these, the NSA method may be a method of using a new radio (NR) system together with an existing LTE system. In the NSA method, a user terminal may use the gNB (or SgNB) of the NR system as well as the eNB of the LTE system. A technology that allows a user terminal to enable a heterogeneous communication system may be referred to as dual connectivity.

The dual connectivity was first proposed by 3GPP release-12, and at the time of the first proposal, dual connectivity, which uses a frequency band of 3.5 GHz as a small cell in addition to a LTE system, was proposed. In the NSA method of 5G, it is under discussion that the dual connectivity proposed by 3GPP release-12 is implemented by using the LTE system as a master node and the NR system as a secondary node.

User equipment (UE) may configure a split bearer in a dual connectivity environment. When the split bearer is configured for uplink (UL), the UE may transmit data through at least one of a path based on a main cell group (MCG) and a path based on a secondary cell group (SCG). When the split bearer is configured, the UE may configure one of the path based on the MCG and the path based on the SCG as a primary path, and may configure the other path as a secondary path. For example, when data to be transmitted is less than a threshold (e.g., an uplink-data split threshold (ul-datasplitthreshold)), the UE may transmit the data to a base station (BS) through the primary path. In this case, the data may not be transmitted or received through the secondary path for a predetermined time (e.g., a DRX inactivity timer), and an entity based on the secondary path may enter a connected mode discontinuous reception (CDRX) state.

SUMMARY

Even while the entity based on the secondary path is in the CDRX state, the UE may transmit transmission data through the primary path. The UE may have to receive reception data corresponding to the transmission data. Meanwhile, the primary path of the UL and the path of the DL may be configured differently. For example, when the path based on the SCG is configured as the primary path of the UL, the path based on the MCG by the UE may be configured as the path of the DL. In this case, an MCG BS may wait until the on-period of the UE arrives and may then transmit the reception data to the UE. For example, although the secondary path is configured as the path of the DL, when the secondary path is in the CDRX state, there may be a delay in the UE receiving the reception data.

The electronic device and the method of operating the same according to various embodiments may transmit data of a designated type through the secondary path, based on transmitting transmission data through the primary path.

An electronic device according to various embodiments may include a first communication processor configured to support first network communication with a first network; and a second communication processor configured to support second network communication with a second network different from the first network, wherein, when the first network communication and the second network communication are configured to be in a state of enabling data transmission, the second communication processor may be configured to transmit transmission data based on the second network communication while the first communication processor is in a CDRX state and to transmit information indicating transmission of the transmission data to the first communication processor, and the first communication processor is configured to switch from the CDRX state to an active state based on acquisition of the information indicating transmission of the transmission data from the second communication processor and to transmit data different from the transmission data.

An operation method of an electronic device including a first communication processor configured to support first network communication with a first network, and a second communication processor configured to support second network communication with a second network different from the first network according to various embodiments, may include, when the first network communication and the second network communication are configured to be in a state of enabling data transmission, transmitting, by the second communication processor, transmission data based on the second network communication while the first communication processor is in a CDRX state, transmitting, by the second communication processor, information indicating transmission of the transmission data to the first communication processor, and switching, by the first communication processor, from the CDRX state to an active state and transmitting data different from the transmission data based on acquisition of the information indicating the transmission of the transmission data from the second communication processor.

A communication device configured to support network communication according to various embodiments may include a communication processor, at least one RFIC configured to convert and output data transmitted from the communication processor into at least one RF signal, and at least one antenna configured to receive each of the at least one RF signal and emit an electromagnetic field, wherein the communication processor may be configured to based on a size of transmission data is less than a designated threshold, transmit the transmission data to the at least one RFIC based on the network communication selected as a primary path, and output information indicating transmission of the transmission data to another communication processor supporting another network communication. The at least one RFIC may be configured to transmit at least one RF signal corresponding to the transmission data to the at least one antenna.

A communication device configured to support network communication may include a communication processor, at least one RFIC configured to convert data transmitted from the communication processor into at least one RF signal and output the at least one RF signal, and at least one antenna configured to receive each of the at least one RF signal and emit an electromagnetic field, wherein the communication processor may be configured to enter a CDRX state based on no data transmission and reception for a predetermined time, to switch from the CDRX state to an active state based on reception of information indicating transmission of transmission data from another communication processor in the CDRX state, and to transmit data different from the transmission data to the at least one RFIC, and wherein the at least one RFIC may be configured to transmit the at least one RF signal corresponding to the data different from the transmission data to the at least one antenna.

A communication device configured to support first network communication with a first network and second network communication with a second network different from the first network according to various embodiments may include a communication processor, at least one first RFIC configured to convert data transmitted from the communication processor into at least one first RF signal and output the at least one first RF signal, at least one first antenna configured to receive each of the at least one first RF signal and emit an electromagnetic field, at least one second RFIC configured to convert the data transmitted from the communication processor into at least one second RF signal and output the at least one second RF signal, the second RF signal having a frequency different from the frequency of the at least one first RF signal, and at least one second antenna configured to receive each of the at least one second RF signal and emit an electromagnetic field, wherein the communication processor may be configured to acquire transmission data while the first network communication is configured in a CDRX state, to transmit the transmission data to the at least one second RFIC, and to transmit data different from the transmission data to the at least one first RFIC, and wherein the at least one first RFIC may be configured to transmit an RF signal corresponding to the data different from the transmission data to the at least one first antenna. The at least one second RFIC may be configured to transmit an RF signal corresponding to the data different from the transmission data to the at least one first antenna.

According to various embodiments, there may be provided an electronic device that can transmit data of a designated type through a secondary path based on transmitting transmission data through a primary path, and a method of operating the same. Accordingly, a BS corresponding to the secondary path may confirm that the electronic device deviates from a CDRX state, and may transmit reception data to the electronic device through the secondary path without waiting.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
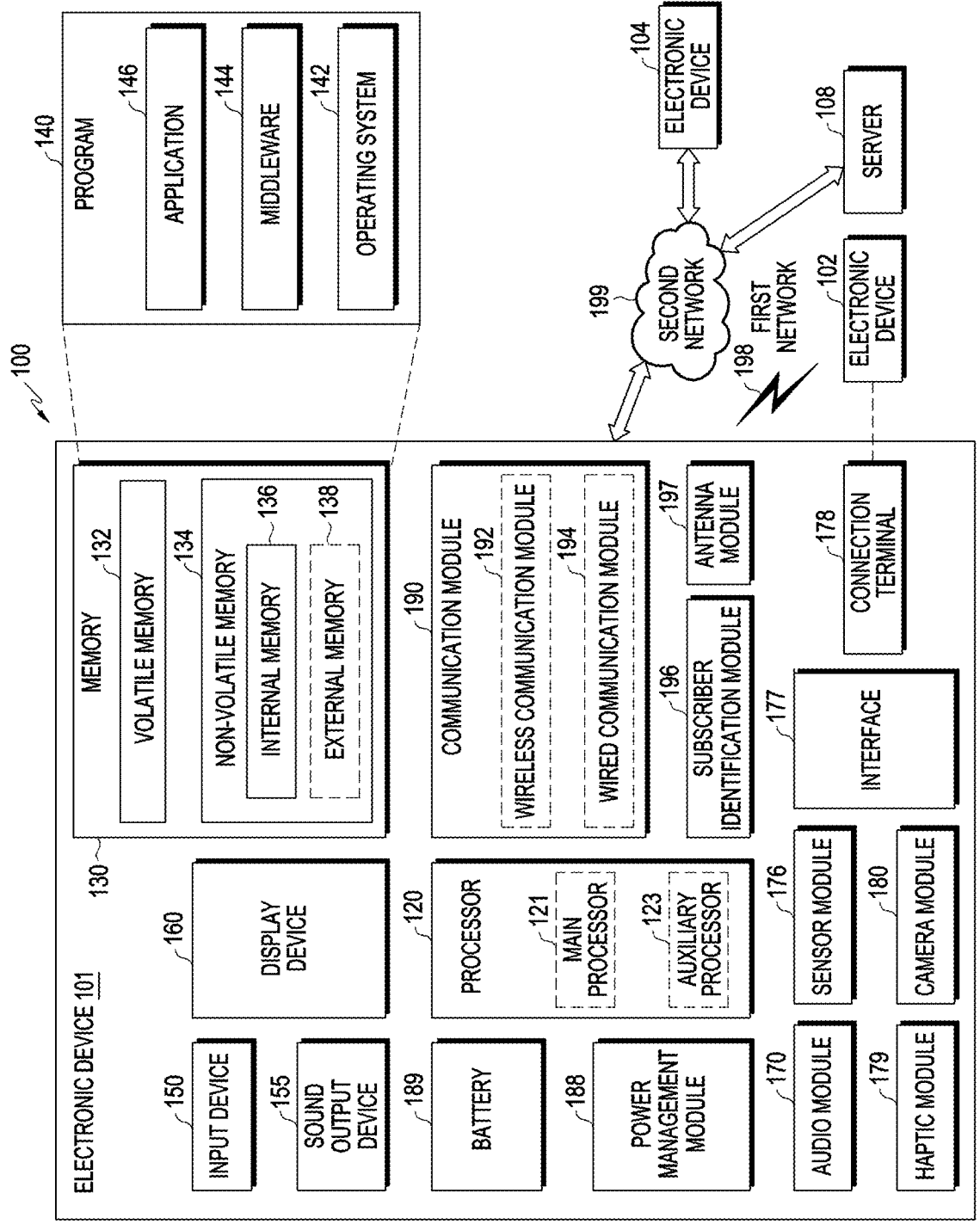
FIG. 1 illustrates a block diagram of an electronic device in a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
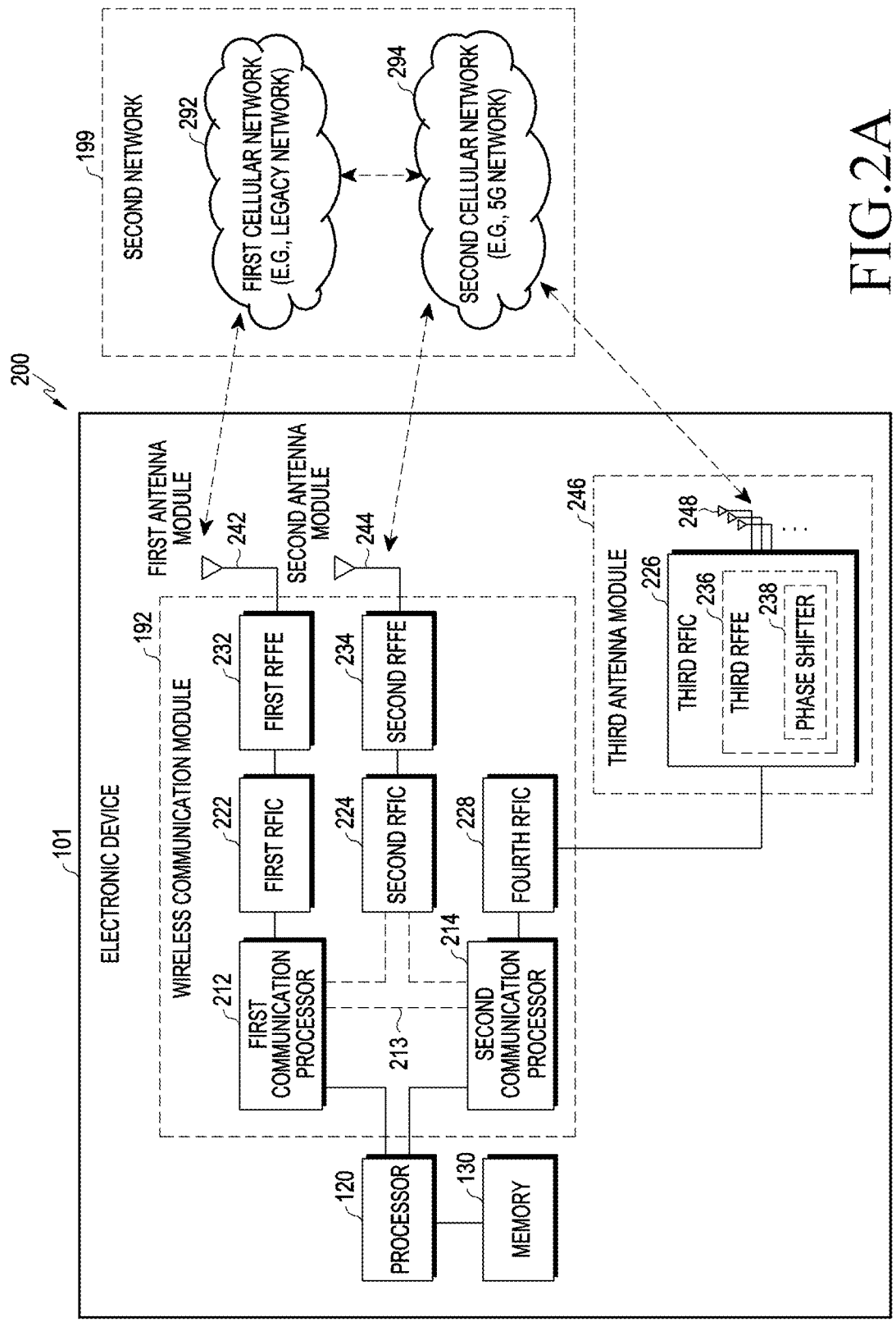
FIG. 2A illustrates a block diagram of an electronic device for supporting legacy network communication and 5G network communication according to various embodiments.

FIG. 2A illustrates a block diagram 200 of an electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of the components described in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a portion of a wireless communication module 192. According to another embodiment, the fourth RFIC 228 may be omitted or included as a portion of the third RFIC 226.

The first communication processor 212 may support establishment of a communication channel of a band to be used for wireless communication with the first cellular network 292 and may support legacy network communication through the established communication channel. According to various embodiments, the first cellular network may be a legacy network including a second generation (2G), 3G, 4G, or long term evolution (LTE) network. The second communication processor 214 may support establishment of a communication channel corresponding to a designated band (e.g., about 6 GHz to about 60 GHz) among bands to be used for wireless communication with the second cellular network 294 and may support 5G network communication through the established communication channel. According to various embodiments, the second cellular network 294 may be a 5G network defined in 3GPP. Additionally, according to an embodiment, the first communication processor 212 or the second communication processor 214 may support establishment of a communication channel corresponding to another designated band (e.g., about 6 GHz or less) among the bands to be used for wireless communication with the second cellular network 294 and may support 5G network communication through the established communication channel.

The first communication processor 212 may transmit and receive data to and from the second communication processor 214. For example, data that was classified to be transmitted through the second cellular network 294 may be changed to be transmitted through the first cellular network 292. In this case, the first communication processor 212 may receive transmission data from the second communication processor 214.

For example, the first communication processor 212 may transmit and receive data to and from the second communication processor 214 through an inter-processor interface 213. The inter-processor interface 213 may be implemented as, for example, a universal asynchronous receiver/transmitter (UART) (e.g., a high speed-UART (HS-UART)) or a peripheral component interconnect bus express (PCIe) interface, but there is no limitation in the kinds thereof. Alternatively, the first communication processor 212 and the second communication processor 214 may exchange control information and packet data information using, for example, a shared memory. The first communication processor 212 may transmit and receive various information, such as sensing information, information on output strength, resource block (RB) allocation information, and the like, to and from the second communication processor 214.

Depending on the implementation, the first communication processor 212 may not be directly connected to the second communication processor 214. In this case, the first communication processor 212 may transmit and receive data to and from the second communication processor 214 through the processor 120 (e.g., application processor). For example, the first communication processor 212 and the second communication processor 214 may transmit and receive data to and from the processor 120 (e.g., an application processor) through an HS-UART interface or a PCIe interface, but there is no limitation in the kinds of the interface. Alternatively, the first communication processor 212 and the second communication processor 214 may exchange control information and packet data information with the processor 120 (e.g., application processor) using a shared memory.

Figure 2B:
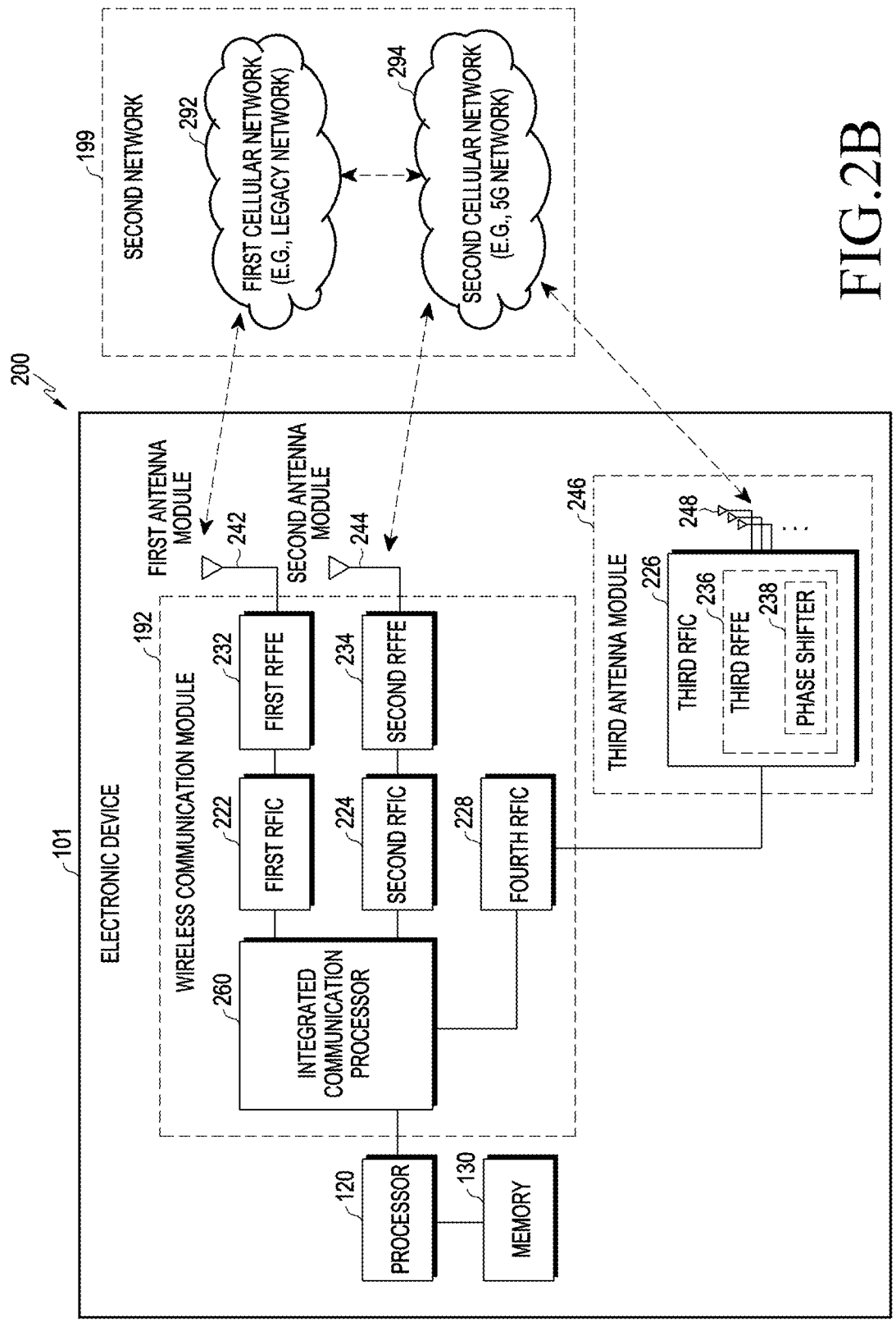
FIG. 2B illustrates a block diagram of an electronic device for supporting legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be formed in a single chip or a single package with the processor 120, an auxiliary coprocessor 123, or a communication module 190. For example, as shown in FIG. 2B, an integrated communication processor 260 may support both a function for communication with the first network and a function for communication with the second network.

Upon transmission, the first RFIC 222 may convert a baseband signal generated by the first communication processor 212 into a radio frequency (RF) signal of about 700 MHz to about 3 GHz used in the first cellular network 292 (e.g., legacy network). Upon reception, the RF signal may be obtained from the first cellular network 292 (e.g., legacy network) via an antenna (e.g., first antenna module 242) and may be preprocessed through an RFFE (e.g., first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal in a Sub6 band (hereinafter, referred to as "5G Sub6 RF signal") (e.g., about 6 GHz or less) used in the second cellular network 294 (e.g., 5G network). Upon reception, the 5G Sub6 RF signal may be obtained from the second cellular network 294 (e.g., 5G network) through an antenna (e.g., second antenna module 244), and may be preprocessed through an RFFE (e.g., second RFFE 234).

The second RFIC 224 may convert the preprocessed 5G Sub6 RF signal into a baseband signal so as to be processed by the corresponding communication processor of either the first communication processor 212 or the second communication processor 214.

The third RFIC 226 may convert a baseband signal generated by the second communication processor 214 into an RF signal in a 5G Above6 band (hereinafter, referred to as "5G Above6 RF signal")(e.g., about 6 GHz to about 60 GHz) to be used in the second cellular network 294 (e.g., 5G network). Upon reception, the 5G Above6 RF signal may be obtained from the second cellular network 294 (e.g., 5G network) through an antenna (e.g., antenna 248), and may be preprocessed through the third RFFE 236. The third RFIC 226 may convert the preprocessed 5G Above RF signal into a baseband signal so as to be processed by the second communication processor 214. According to an embodiment, the third RFFE 236 may be formed as a portion of the third RFIC 226.

According to an embodiment, the electronic device 101 may include the fourth RFIC 228 separately from or at least as a portion of the third RFIC 226. In this case, the fourth RFIC 228 may convert a baseband signal generated by the second communication processor 214 into an RF signal in an intermediate frequency band (hereinafter, referred to as "IF signal") (e.g., about 9 GHz to about 11 GHz), and may then transmit the IF signal to the third RFIC 226. The third RFIC 226 may convert the IF signal into the 5G Above6 RF signal. Upon reception, the 5G Above6 RF signal may be received from the second cellular network 294 (e.g., 5G network) via an antenna (e.g., antenna 248) and may be converted into an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one antenna module of the first antenna module 242 or the second antenna module 244 may be omitted or combined with another antenna module to process RF signals of a corresponding plurality of bands.

According to an embodiment, the third RFIC 226 and the antenna 248 may be disposed on the same substrate to form a third antenna module 246. For example, the wireless communication module 192 or the processor 120 may be disposed on a first substrate (e.g., main PCB). In this case, the third RFIC 226 may be disposed in one region (e.g., lower surface) of a second substrate (e.g., sub PCB) that is separate from the first substrate and the antenna 248 may be disposed in another region (e.g., upper surface) thereof so that the third antennal module 246 may be formed. By placing the third RFIC 226 and the antenna 248 in the same substrate, it is possible to reduce the length of a transmission line therebetween. This may reduce, for example, a loss (e.g., attenuation) of a signal in a high frequency band (e.g., about 6 GHz to about 60 GHz) used for 5G network communication due to the transmission line. As a result, the electronic device 101 may improve the quality or speed of communication with the second cellular network 294 (e.g., 5G network).

According to an embodiment, the antenna 248 may be formed as an antenna array including a plurality of antenna elements that may be used for beamforming. In this case, the third RFIC 226 may include a plurality of phase shifters 238 corresponding to the plurality of antenna elements, for example, as a portion of the third RFFE 236. Upon transmission, each of the plurality of phase shifters 238 may convert the phase of a 5G Above6 RF signal to be transmitted to the outside of the electronic device 101 (e.g., a base station (BS) of a 5G network) through a corresponding antenna element. Upon reception, each of the plurality of phase shifters 238 may convert the phase of the 5G Above6 RF signal received from the outside into the same or substantially the same phase through the corresponding antenna element. This may enable transmission or reception through beamforming between the electronic device 101 and the outside.

The second cellular network 294 (e.g. 5G network) may operate independently of (e.g. stand-alone (SA)) the first cellular network 292 (e.g. legacy network), or may operate in conjunction with the first cellular network 292 (e.g. non-standalone (NSA)). For example, in the 5G network, there may be only an access network (e.g., 5G radio access network (RAN) or next generation RAN (NG RAN)), but there may be no core network (e.g., next generation core (NGC)). In this case, the electronic device 101 may access the access network of a 5G network and may then access an external network (e.g., the Internet) under the control of a core network (e.g., evolved packed core (EPC)) of a legacy network. Protocol information (e.g., LTE protocol information) for communication with the legacy network or protocol information (e.g., new radio (NR) protocol information) for communication with the 5G network may be stored in the memory 230, and may be accessed by other components (e.g., the processor 120, the first communication processor 212, or the second communication processor 214).

Figure 3:
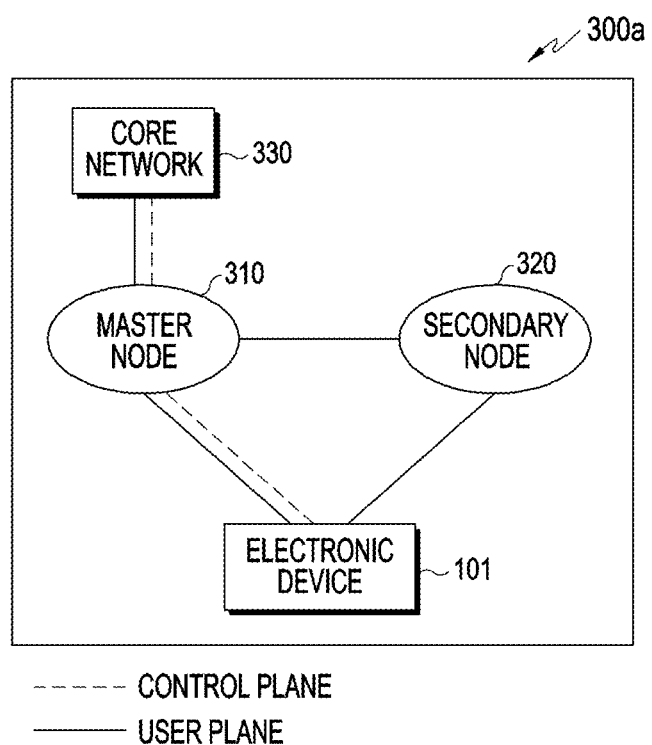
FIG. 3 illustrates a diagram of wireless communication systems that provide a network of legacy communication and/or 5G communication according to various embodiments.

FIG. 3 illustrates a diagram of wireless communication systems that provide a network of legacy communication and/or 5G communication according to various embodiments. Referring to FIG. 3, a network environment 300a may include at least one of a legacy network and a 5G network. The legacy network may include, for example, a 4G or LTE BS 340 (e.g., eNodeB (eNB)) of 3GPP standard that supports wireless connection with the electronic device 101 and an evolved packet core (EPC) that manages 4G communication. The 5G network may include, for example, a new radio (NR) BS (e.g., gNodeB (gNB)) that supports wireless connection with the electronic device 101 and a $5^{th}$ generation core (5GC) that manages 5G communication of the electronic device 101.

According to various embodiments, the electronic device 101 may transmit and receive a control message and user data through legacy communication and/or 5G communication. The control message may include a message related to, for example, at least one of security control, bearer setup, authentication, registration, or mobility management of the electronic device 101. The user data may refer to user data except for the control message transmitted and received between the electronic device 101 and a core network 330 (e.g., EPC).

Referring to FIG. 3, the electronic device 101 according to an embodiment may transmit and receive at least a portion (e.g., gNB or 5GC) of a 5G network and at least one of the control message or the user data using at least a portion (e.g., LTE BS or EPC) of a legacy network.

According to various embodiments, the network environment 300a may include a network environment that provides wireless communication dual connectivity (DC) from the LTE BS and the NR BS and transmits and receives a control message to and from the electronic device 101 through one core network 230 of the EPC or the 5GC.

According to various embodiments, in a DC environment, one of the LTE BS or the NR BS may operate as a master node (MN) 310 and the other one thereof may operate as a secondary node (SN) 320. The MN 310 may be connected to the core network 230 to transmit and receive a control message. The MN 310 and the SN 320 may be connected to each other through a network interface to transmit and receive messages related to radio resource (e.g., communication channel) management.

According to various embodiments, the MN 310 may be constituted of an LTE BS 340, the SN 320 may be constituted of an NR BS, and the core network 330 may be constituted of an EPC. For example, control messages may be transmitted and received through the LTE BS and the EPC, and user data may be transmitted and received through at least one of the LTE BS and the NR BS.

According to various embodiments, the MN 310 may be constituted of an NR gNB, the SN 320 may be constituted of an LTE BS, and the core network 330 may be constituted of a 5GC. For example, control messages may be transmitted and received through the NR BS and the 5GC, and user data may be transmitted and received through at least one of the LTE BS and the NR BS.

According to various embodiments, the electronic device 101 may be registered in at least one of the EPC or the 5GC to transmit and receive a control message.

According to various embodiments, the EPC or the 5GC may manage communication of the electronic device 101 by interworking. For example, mobility information of the electronic device 101 may be transmitted and received through an interface between the EPC and 5GC.

As described above, dual connectivity through the LTE BS and the NR BS may be referred to as E-UTRA new radio dual connectivity (EN-DC).

Figure 4:
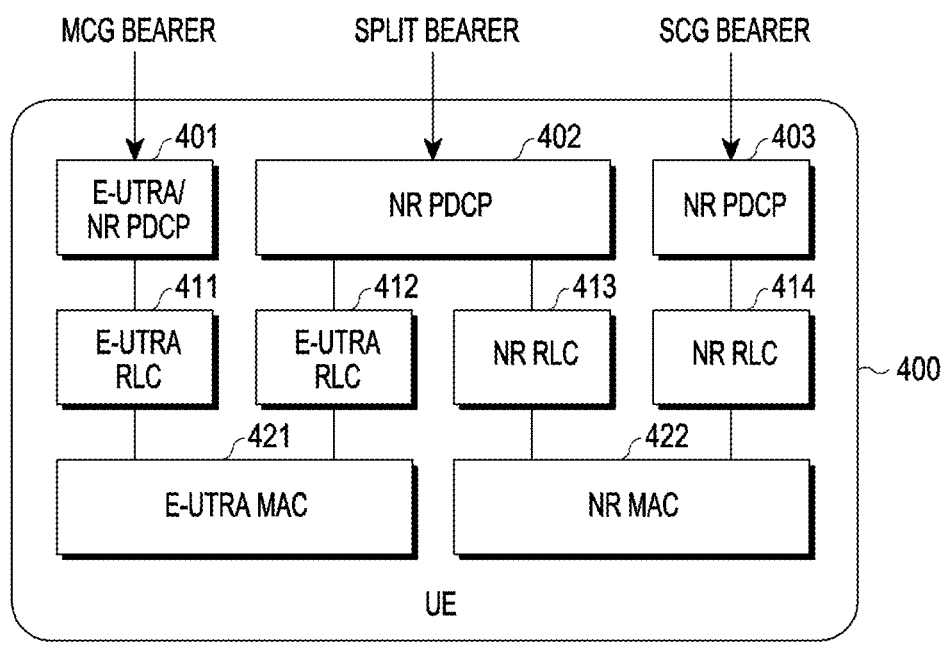
FIG. 4 illustrates a diagram of a bearer in a UE according to various embodiments.

FIG. 4 illustrates a diagram of a bearer in a UE according to various embodiments.

According to various embodiments, an available bearer in a 5G non-standalone network environment (e.g., the network environment 300a of FIG. 3A) may include a master cell group (MCG) bearer, a secondary cell group (SCG) bearer, and a split bearer. In user equipment (UE) 400, an E-UTRA/NR packet data convergence protocol (PDCP) entity 401 and NR PDCP entities 402 and 403 may be configured. In the UE 400, E-UTRA radio link control entities 411 and 412, and NR RLC entities 413 and 414 may be configured. In the UE 400, an E-UTRA MAC entity 421 and an NR MAC entity 422 may be configured. The UE may represent a user device capable of communicating with a BS, and may be used interchangeably with the electronic device 101 of FIG. 1. For example, in the various embodiments of the disclosure, the UE performing a specific operation may mean that at least one component included in the electronic device 101 performs the specific operation.

According to various embodiments, the MCG may correspond to, for example, a main node (MN) of FIG. 3A, and the SCG may correspond to, for example, a secondary node (SN) of FIG. 3A. When a node for performing communication is determined, the UE 400 may configure various entities shown in FIG. 4 to communicate with the determined node (e.g., a BS). The entities 401, 402, and 403 of a PDCP layer may receive data (e.g. PDCP SDU corresponding to an IP packet) and may output converted data (e.g., PDCP protocol data unit (PDCP PDU)) reflecting additional information (e.g., header information). The entities 411, 412, 413, and 414 of the RLC layer may receive the converted data (e.g., PDCP PDU) output from the entities 401, 402, and 403 of the PDCP layer, and may output converted data (e.g., RLC PDU) reflecting additional information (e.g., header information). The entities 421 and 422 of the MAC layer may receive the converted data (e.g., RLC PDU) output from the entities 411, 412, 413, and 414 of the RLC layer, and may output converted data (e.g., MAC PDU) reflecting additional information (e.g., header information) to transmit the output data to a physical layer (not shown). Various embodiments of the information conversion process between the entities will be described in more detail with reference to FIGS. 9A to 9D.

According to various embodiments, an MCG bearer may be associated with a path (or data) capable of transmitting and receiving data using only a resource or entity corresponding to the MN in dual connectivity. An SCG bearer may be associated with a path (or data) capable of transmitting and receiving data using only a resource or entity corresponding to the SN in dual connectivity. A split bearer may be associated with a path (or data) capable of transmitting and receiving data using a resource or entity corresponding to the MN and a resource or entity corresponding to the SN in dual connectivity. Accordingly, as shown in FIG. 4, the split bearer may be associated with all of the E-UTRA RLC entity 412, the NR RLC entity 413, the E-UTRA MAC entity 421, and the NR MAC entity 422 through the NR PDCD entity 402.

Figure 5A:
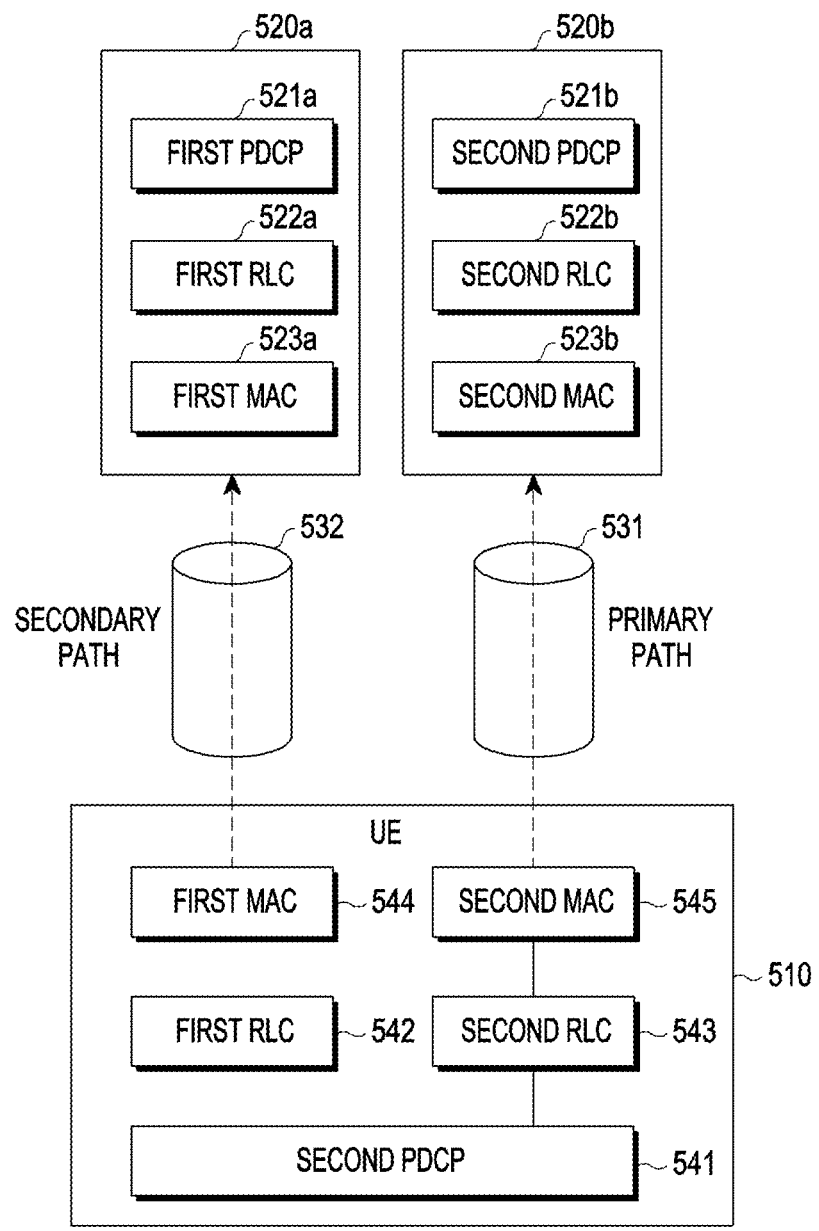
FIG. 5A illustrates a diagram of an uplink (UL) path between a UE and BSs according to various embodiments.

FIG. 5A illustrates a diagram of an uplink (UL) path between a UE and BSs according to various embodiments.

In FIG. 5A, a UE 510 (e.g., the electronic device 101) according to various embodiments may perform communication with BSs 520a and 520b based on a split bearer. Accordingly, transmission data (e.g., IP packet) to be transmitted from the UE 510 to the BSs 520a and 520b may be transmitted to a second RLC entity 543 and a second MAC entity 545 or a first RLC entity 542 and a first MAC entity 544 through a second PDCP entity 541. For example, the first RLC entity 542 and the first MAC entity 544 may be associated with a first cellular network and the second RLC entity 543 and the second MAC entity 545 may be associated with a second cellular network. The first BS 520a may configure a first PDCP entity 521a, a first RLC entity 522a, and a first MAC entity 523a. The second BS 520b may configure a second PDCP entity 521b, a second RLC entity 522b, and a second MAC entity 523b. A path associated with the second RLC entity 543 and second MAC entity 545 of the UE 510 may be a primary path 531, and a path associated with the first RLC entity 542 and the first MAC entity 544 may be a secondary path 532. Here, the first PDCP entity 521a may be implemented in the same way as that in the second PDCP entity 521b. For example, for implementation of EN-DC, if the BS 520a is an LTE BS, the first PDCP entity 521a may be configured as an NR PDCP entity. In various embodiments, a specific PDCP entity (e.g., NR PDCP entity) may be present in the BS 520a or the BS 520b. If the split bearer is configured, at least one of the first PDCP entity 521a or the second PDCP entity 521b may transmit data to a core network. In various embodiments, either the first PDCP entity 521a or the second PDCP entity 521b may not be present. The BS 520a and the BS 520b may communicate directly with each other.

According to various embodiments, a first cellular network and a second cellular network are not limited as long as they are networks enabling dual connectivity. For example, the first cellular network and the second cellular network may correspond to LTE communication and NR communication, respectively. For example, the first cellular network and the second cellular network are both related to LTE communication, and the second cellular network may correspond to a small-cell of a specific frequency. For example, both of the first cellular network and the second cellular network are related to 5G, where the first cellular network may correspond to a frequency band below 6 GHz (e.g., below 6) and the second cellular network may correspond to a frequency band of 6 GHz or more (e.g., over 6).

According to various embodiments, the UE 510 may transmit transmission data to and from the BSs 520a and 520b using at least one of the first cellular network and the second cellular network based on the split bearer. The UE 510 according to various embodiments may configure the second cellular network associated with the second BS 520b corresponding to SCG as the primary path 531, and may configure the first cellular network associated with the first BS 520a corresponding to MCG as the secondary path 532. For example, the UE 510 may configure the second cellular network associated with SCG as the primary path 531 based on information indicating the primary path received from the MN. The information indicating the primary path received from the MN may be included in an RRC signal (e.g., RRC connection reconfiguration) and received. In another embodiment, there is no limitation in a method in which the UE 510 configures the primary path. The primary path may be determined based on, for example, the policy of each mobile carrier, and the UE 510 may receive the information indicating the primary path and may confirm the primary path. The primary path may indicate the cell group ID and LCD of a primary RLC entity for UL data transmission when the PDCP entity is associated with more than one RLC entity. The second PDCP entity 521b may be included in the BS 520a having the primary path. According to various embodiments, the first PDCP entity 521a may be included in the BS 520b having the secondary path.

In various embodiments, the UE 510 may confirm information on UL-data split threshold (ul-datasplitthreshold). The UE 510 may receive and confirm the information on UL-data split threshold from the MN. The information on uplink-data split threshold may be included in a UE-specific or UE-dedicated RRC signal (e.g., RRC connection reconfiguration). According to various embodiments, there is no limitation in a method in which the UE 510 confirms the information on UL-data split threshold.

Table 1 below shows at least a portion of an RRC connection reconfiguration message according to various embodiments.

TABLE 1

| RRC connection reconfiguration-IEs ::= | | SEQUENCE { | |
|---|---|---|---|
| radioBearerConfig | | RadioBearerConfig | OPTIONAL, -- Need M |
| OPTIONAL, -- Need M | | | |
| RadioBearerConfig ::= | | SEQUENCE { | |
| ... | | | |
| drb-ToAddModList, | | DRB-ToAddModList | |
| OPTIONAL, -- Need N | | | |
| ... | | | |
| } | | | |
| DRB-ToAddModList ::= | | SEQUENCE (SIZE (1..maxDRB)) OF DRB-ToAddMod | |
| DRB-ToAddMod ::= | | SEQUENCE { | |
| ... | | | |
| pdcp-Config | | PDCP-Config | |
| | OPTIONAL, | -- Cond PDCP | |
| ... | | | |
| } | | | |
| PDCP-Config ::= | | SEQUENCE { | |
| drb | | SEQUENCE { | |
| ... | | | |
| moreThanOneRLC | | SEQUENCE { | |
| | primaryPath | SEQUENCE { | |
| | cellGroup | CellGroupId | |
| | OPTIONAL, | -- Need R | |
| | logicalChannel | LogicalChannelIdentity | |
| OPTIONAL | -- Need R | | |
| | }, | | |
| | ul-DataSplitThreshold | UL-DataSplitThreshold | OPTIONAL. -- Cond SplitBearer |
| | pdcp-Duplication | ENUMERATED { true } | |
| OPTIONAL | -- Need R | | |
| } | | | |

As underlined above, in the RRC connection reconfiguration message, ul-datasplitthreshold may be defined as the UL split threshold.

According to various embodiments, the information on UL-data split threshold may also be determined based on the policy of each mobile carrier. The UE 510 may confirm that a transmitting PDCP entity (e.g., the second PDCP entity 541) is associated with two or more RLC entities (e.g., the first RLC entity 542 and the second RLC entity 543) and the two or more associated RLC entities (e.g., the first RLC entity 542 and the second RLC entity 543) are included in different cell groups. In this case, the UE 510 may identify whether the total amount of PDCP data volume and RLC data volume is greater than or equal to the UL split threshold. If the total amount of PDCP data volume and RLC data volume is greater than or equal to the UL split threshold, the transmitting PDCP entity of the UE 510 (e.g., the second PDCP entity 541) may submit a PDCP PDU to a primary RLC entity or a secondary RLC entity. If the total amount of PDCP data volume and RLC data volume is smaller than the UL split threshold, the transmitting PDCP entity of the UE 510 (e.g., the second PDCP entity 541) may submit a PDCP PDU only to the primary RPC entity. As described above, when the size of data to be transmitted is greater than or equal to a threshold, the UE 510 may transmit the data through the primary path 531 and the secondary path 532. When the size of data to be transmitted is less than the threshold, the UE 510 may transmit data only through the primary path 531. In this case, the data may not be transmitted/received through the secondary path 532 of the UE 510. Based on no data being transmitted or received for a designated period of time, an entity associated with the secondary path 532 (or hardware associated with the secondary path 532) may enter a connected mode DRX (CDRX) state, and various embodiments thereof will be described later.

Figure 5B:
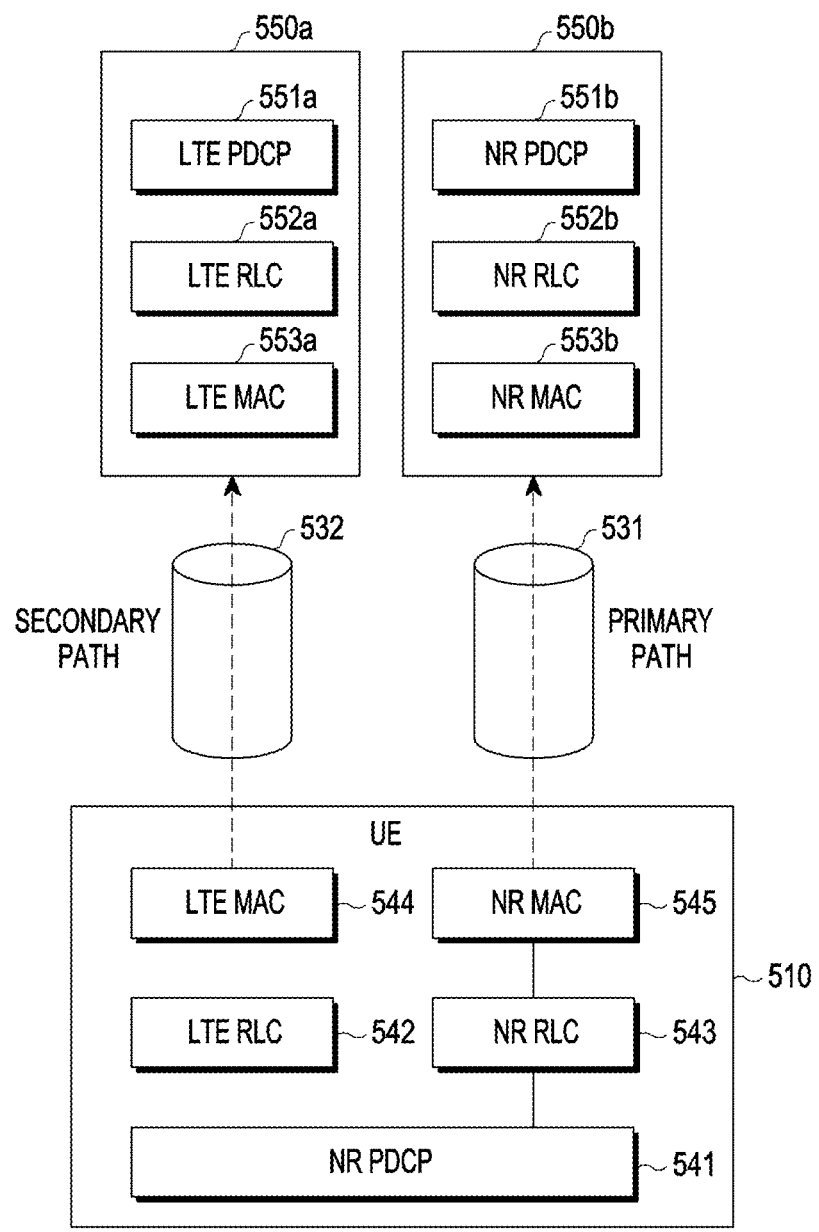
FIG. 5B illustrates a diagram of a path between a UE and a BS when a split bearer is configured in an EN-DC according to various embodiments.

FIG. 5B illustrates a diagram of a path between a UE and a BS when a split bearer is configured in an EN-DC according to various embodiments.

The UE 510 according to various embodiments may configure a split bearer in EN-DC, so that the NR PDCP entity 541 may be associated with the LTE RLC entity 542 and the NR RLC entity 543. The LTE RLC entity 542 may be associated with the LTE MAC entity 544, and the NR RLC entity 543 may be associated with the NR MAC entity 545. An NR MAC entity 553b of BS 550b may correspond to the NR MAC entity 545, and an LTE MAC entity 553a of the BS 550a may correspond to the LTE MAC entity 544. An NR PDCP entity 551a of the BS 550a may be associated with an LTE RLC entity 552a, and an NR PDCP entity 551b of the BS 550b may be associated with an NR RLC entity 552b. The LTE RLC entity 522a may be associated with the LTE MAC entity 553a and the NR RLC entity 552b may be associated with the NR MAC entity 553b. An NR network may be configured as the primary path 531 and an LTE network may be configured as the secondary path 532. In EN-DC, in case of the BS 550a of LTE, the standard has suggested that the NR PDCP entity 551a be configured. In particular, for the split bearer, in the BS 550a of LTE, the NR PDCP entity 551a should be configured. The NR PDCP entity may be present in the BS 550a of LTE or present in the NR BS 550b. In case of the split bearer, at least one of the NR PDCP entity 551a of the LTE BS 550a or the NR PDCP entity 551b of the NR BS 550b may transmit data to a core network. Effectively, it may be advantageous for the NR PDCP entity 551b to be configured in the primary path 531. However, it may also be possible for the NR PDCP entity 551a to be configured in the LTE BS 550a, and for this reason, the NR PDCP entity 551a is indicated by a dotted line. In addition, the LTE BS 550a and the NR BS 550b may directly transmit and receive data to and from each other. Meanwhile, as described above, in addition to the EN-DC as shown in FIG. 5B, various embodiments of the disclosure by various DCs can be applied.

Figure 6A:
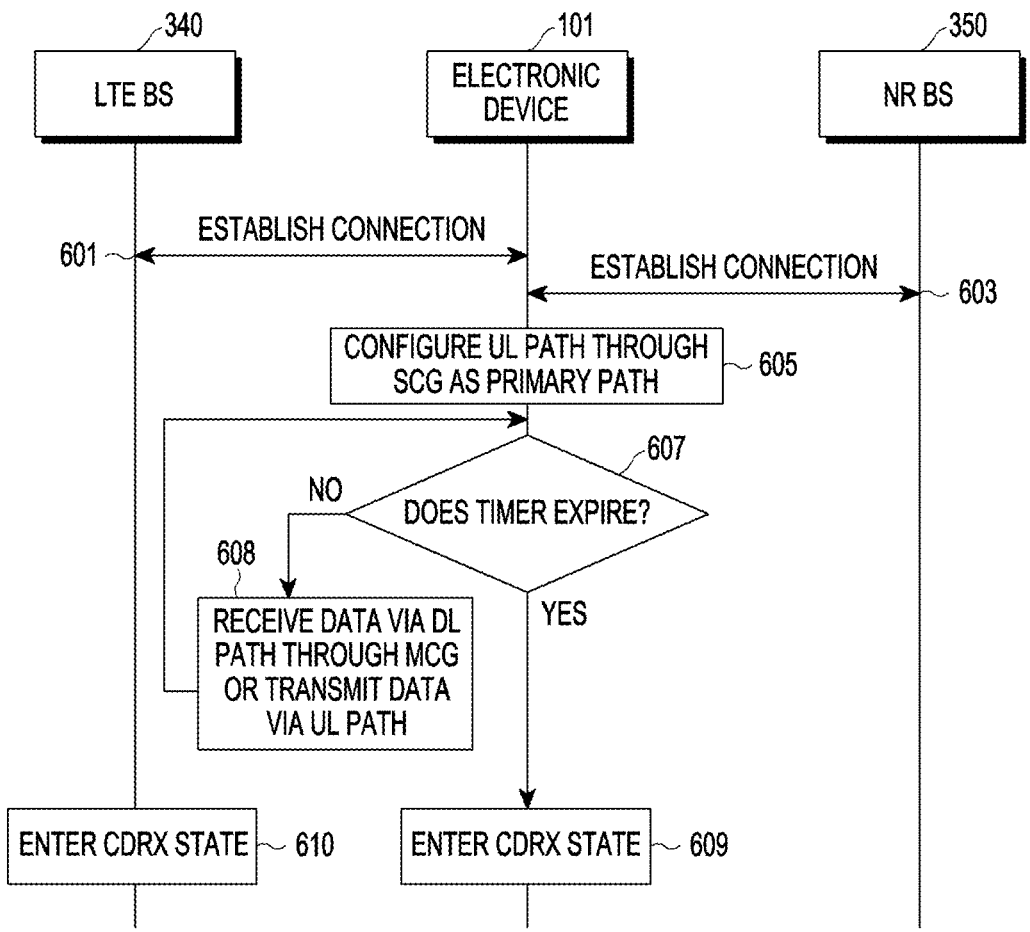
FIG. 6A illustrates a flowchart of a method of operating an electronic device, an LTE BS, and an NR BS according to various embodiments.

FIG. 6A illustrates a flowchart of a method of operating an electronic device, an LTE BS, and an NR BS according to various embodiments.

According to various embodiments, in operation 601, the electronic device 101 (e.g., at least one processor (e.g., at least one of the processor 120, the first communication processor 212, the second communication processor 214, or the integrated communication processor 260)) may establish a connection with the LTE BS 340. The establishing, by the electronic device 101, the connection with the LTE BS 340 may include, for example, at least one of: acquiring, by an MME associated with the LTE BS 340, an IMSI of the electronic device 101 (e.g., UE); authenticating, by the electronic device 101, an LTE network; authenticating, by the MME, the electronic device 101; setting up NAS security; updating a corresponding location; or establishing an EPS session. Those skilled in the art will readily understand that a connection may be established by the operation of an entity (e.g., MME, S-GW, P-GW, HSS, PCRF, or SPR) other than the LET BS 340 (e.g., eNodeB). For example, the electronic device 101 may establish the connection by transmitting and receiving data not only to and from the LTE BS 340 but also to and from an entity other than the LTE BS 340, and the establishment of the connection may mean attach completion.

In operation 603, the electronic device 101 according to various embodiments may establish a connection with the NR BS 350. For example, the LTE BS 340 may transmit an RRC connection reconfiguration message including config for SCG cell measurement (e.g., measurement object (MO) for SCG), and the electronic device 101 may transmit the result of the SCG cell measurement to the LTE BS 340. The LTE BS 340 may select an SCG, may transmit an additional request (e.g., SgNB Add Request) to the selected NR BS 350, and may receive Ack for the request from the NR BS 350. The LTE BS 340 may transmit an RRC connection reconfiguration message for SCG additional configuration to the electronic device 101. The electronic device 101 may perform SSB synchronization and may perform RACH with the NR BS 350. Accordingly, SCG addition may be completed (SCG add complete).

According to various embodiments, in operation 605, the electronic device 101 may configure an UL path through the SCG (or SN) as the primary path. For example, the electronic device 101 may configure the UL path through the SCG as the primary path based on information within the RRC connection reconfiguration message. When the size of data to be transmitted (e.g., the total amount of the PDCP data volume and the RLC data volume) is smaller than an UL split threshold, the electronic device 101 may transmit the transmission data through the primary path.

According to various embodiments, in operation 607, the electronic device 101 may identify whether a timer expires. The electronic device 101 may start the timer (e.g., a DRX inactivity timer) after successfully decoding a physical downlink control channel (PDCCH) indicating UL or DL user data for the electronic device 101. For example, the timer may be started for the secondary path that is not the UL primary path of the electronic device 101. Parameters related to discontinuous reception (DRX) may be reflected in MAC-Main config of the RRC connection reconfiguration message, but there is no limitation in a method in which the electronic device 101 obtains the parameters related to the DRX. The expiration time of the timer may be expressed by, for example, the number of consecutive TTIs, and the electronic device 101 may monitor the PDCCH until the timer expires. If transmission data or reception data is expected as a result of monitoring the PDCCH, the timer may be restarted. If the timer does not expire (607—NO), in operation 608, the electronic device 101 may receive data via the DL path or may transmit data via the UL path through the MCG.

According to various embodiments, if the timer expires (608—YES), in operation 609, the electronic device 101 may enter a CDRX state. Here, the fact that the electronic device 101 enters the CDRX state may mean that a node whose timer has expired in the electronic device 101 stops constant PDCCH monitoring and performs PDCCH monitoring at a designated cycle (e.g., short DRX cycle or long DRX cycle). In the CDRX state, the electronic device 101 may periodically monitor the PDCCH in a path corresponding to the MCG. In this case, in operation 610, the LTE BS 340 may also enter the CDRX state. The LTE BS 340 may enter the CDRX state, for example, by identifying itself that the timer has expired. The LTE BS 340 may transmit data while the electronic device 101 monitors the PDCCH and may wait for data transmission while an LTE modem of the electronic device 101 is in a sleep state.

According to various embodiments, even while the electronic device 101 transmits and receives data via the path through the SCG, if data is not transmitted and received via the path through the MCG, a CP corresponding to the MCG may enter the CDRX state. The electronic device 101 may control the CP corresponding to the MCG to be in the CDRX state while maintaining the CP corresponding to the SCG in an active state. Alternatively, the electronic device 101 may control only a block corresponding to the MCG in an integrated CP to be in the CDRX state, and may control a block corresponding to the SCG to be in an activated state. The block may represent, for example, independent hardware enabling a CP operation in an SoC or may represent a logical block.

In FIG. 6A, although the path corresponding to the NR is configured as the primary path and the entity (e.g., the CP) corresponding to the LTE enters the CDRX state, this is merely illustrative, and the electronic device 101 may configure the path corresponding to LTE as the primary path and may then configure the entity (e.g., the CP) corresponding to the NR to enter the CDRX state according to the timer expiration. In various embodiments of the disclosure, the operations performed based on the entity associated with the NR of the electronic device 101 and the operations performed based on the entity associated with the LTE may be performed interchangeably.

Figure 6B:
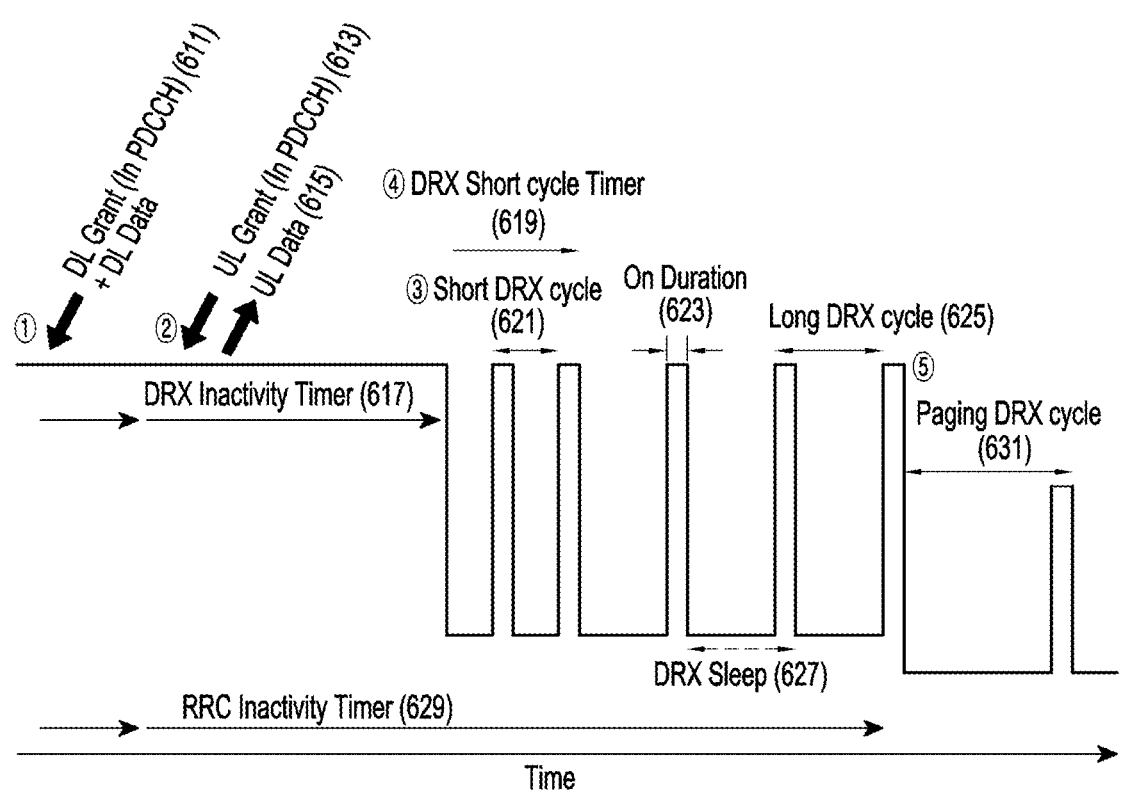
FIG. 6B illustrates a timing diagram of an operation in a CDRX state according to various embodiments.

FIG. 6B illustrates a timing diagram of an operation in a CDRX state according to various embodiments.

According to various embodiments, at least one of at least some of the first communication processor 212, the second communication processor 214, or the integrated communication processor 260 of FIG. 2A or 2B may enter a CDRX state based on timer expiration. In operation 611, the electronic device 101 may receive a DL grant and DL data on a PDCCH. The electronic device 101 may restart a timer. Before the timer expires, the electronic device 101 may confirm, for example, an UL grant in the PDCCH in operation 613 and may transmit UL data in operation 615. The electronic device 101 may restart a timer 617 (e.g., a DRX inactivity timer). Before the timer expires, the electronic device 101 may monitor the PDCCH at all times, for example, for all subframes.

According to various embodiments, when the timer expires, the electronic device 101 may enter the CDRX state. In the CDRX state, the electronic device 101 may perform PDCCH monitoring at a short DRX cycle 621. For example, the electronic device 101 may not perform PDCCH monitoring on some subframes. The monitoring may be performed for on-duration 623. During a period other than the on-duration 623, an entity (e.g., a CP) entering the CDRX state of the electronic device 101 may be in a sleep state 627, thereby saving power consumption. The electronic device 101 may start a DRX short cycle timer 619 while entering the CDRX state. When the DRX short cycle timer 619 expires, the electronic device 101 may monitor the PDCCH at a long DRX cycle 625. When an RRC inactivity timer 629 expires, the electronic device 101 may enter an RRC idle state and may monitor the PDCCH at a paging DRX cycle 631. In various embodiments, when entering the CDRX state, the electronic device 101 may monitor the PDCCH at a single cycle (e.g., a long-term DRX cycle).

Meanwhile, a BS (e.g., LTE BS) according to various embodiments may transmit data to the electronic device 101 for the on-duration 623 of the electronic device 101. The DRX cycle may be synchronized between the electronic device 101 and the BS, and accordingly, the BS may also identify whether the electronic device 101 is in the on-duration 623 and the sleep state 627, and may schedule the electronic device 101 based on the identification result. Even though the BS obtains data and completes modulation during the sleep state 627 before the on-duration 623, the BS may wait for transmission of data (e.g., at least one of DL grant or DL data) until the on-duration 623 arrives.

Figure 7A:
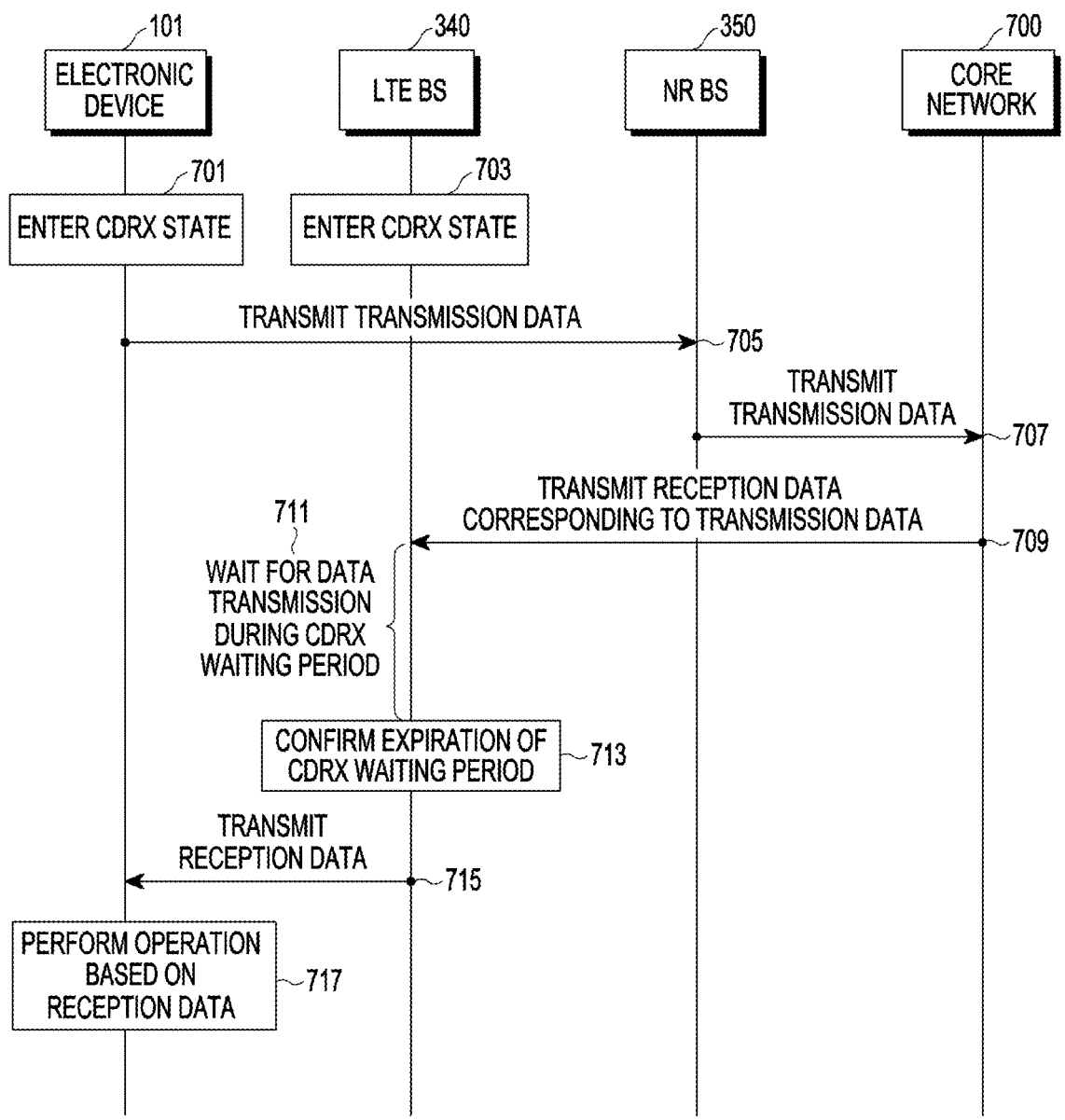
FIG. 7A illustrates a flowchart of the operation of an electronic device, an LTE BS, an NR BS, and a core network according to a comparative example for comparison with various embodiments.

FIG. 7A illustrates a flowchart of the operation of an electronic device, an LTE BS, an NR BS, and a core network according to a comparative example for comparison with various embodiments.

According to the comparative example, the electronic device 101 may enter a CDRX state in operation 701. For example, the LTE modem of the electronic device 101 may enter the CDRX state. The LTE BS 340 may enter the CDRX state in operation 703. As described above, the electronic device 101 may monitor the PDCCH at least one cycle, and the LTE BS 340 may be configured to transmit data to the electronic device 101 during the monitoring period. In operation 705, the electronic device 101 may transmit transmission data to the NR BS 350 through a primary path. The NR BS 350 may transmit transmission data to a core network 700 (e.g., the core network 330 of FIG. 3A) in operation 707. The core network 700 may transmit the transmission data to another entity (e.g., the server 106 of FIG. 1) through an external network (e.g., the Internet), and may receive reception data corresponding to the transmission data from the other entity.

According to various embodiments, the core network 700, in operation 709, may transmit the reception data (e.g., internet control message protocol (ICMP) response, Ack, Nack, or data in response to the request of transmission data) corresponding to the transmission data to the LTE BS 340. For example, the electronic device 101 may be configured so that DL uses an LTE communication network. The transmission data may be data corresponding to data to be transmitted. As described above, in operation 711, the LTE BS 340 may wait for data transmission during a CDRX waiting period (e.g., the sleep state 627). The LTE BS 340 may wait for data transmission until the monitoring period of the electronic device 101 (e.g., the on-duration 623) arrives. In operation 713, the LTE BS 340 may confirm the expiration of the CDRX waiting period (e.g., the short DRX cycle 621 or the DRX long cycle 625). In operation 715, the LTE BS 340 may transmit reception data to the electronic device 101. In operation 717, the electronic device 101 may perform an operation based on the reception data. According to the comparative example, the LTE BS 340 may wait for transmission of the reception data before the CDRX waiting period expires in the CDRX state. Accordingly, the time required for the electronic device 101 to process the reception data may increase. For example, in a case of a ping or web browsing screen request sent from the electronic device, an increase in the required time may be intensified.

Figure 7B:
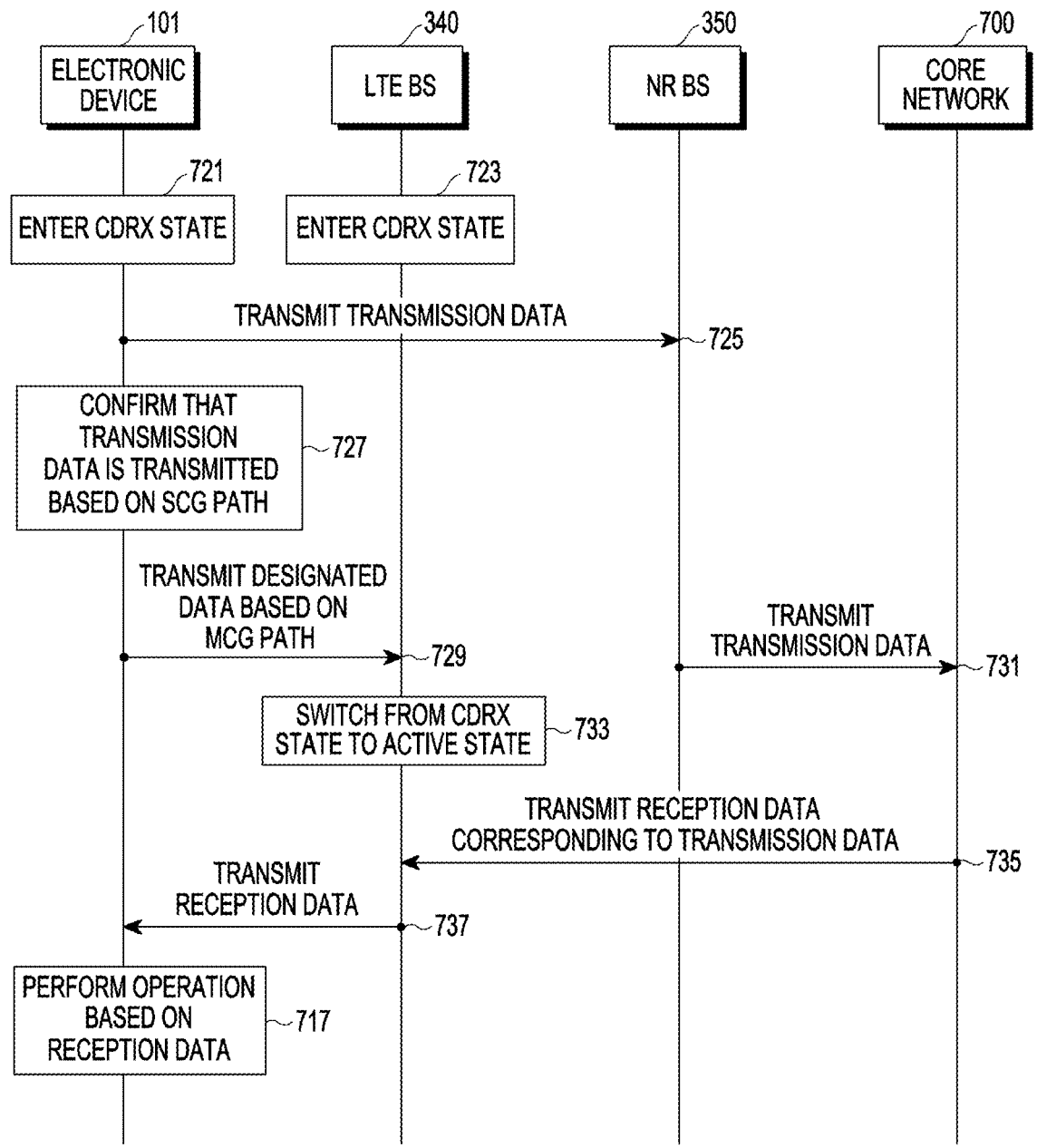
FIG. 7B illustrates a flowchart of the operation of an electronic device, an LTE BS, an NR BS, and a core network according to various embodiments.

FIG. 7B illustrates a flowchart of the operation of an electronic device, an LTE BS, an NR BS, and a core network according to various embodiments.

According to various embodiments, in operation 721, at least some functions (or modules) of a communication processor (e.g., the first communication processor 212 of FIG. 2A) corresponding to the LTE of the electronic device 101 or an integrated communication processor (e.g., the integrated communication processor 260 of FIG. 2B) may enter a CDRX state. For example, the electronic device 101 may configure a split bearer for UL. The electronic device 101 may configure an NR-based path as a primary path of the UL, and may configure an LTE-based path as a secondary path of the UL. Meanwhile, the DL of the electronic device 101 may be configured as the LTE-based path. Data may not be transmitted or received during a designated period (e.g., a DRX inactivity timer) through the LTE-based path of the electronic device 101, and based on this, the electronic device 101 may enter the CDRX state. The electronic device 101 may monitor a PDDCH in at least one designated period (e.g., the short term DRX cycle 621 or the long term DRX cycle 625 of FIG. 6). In the CDRX state, the LTE BS 340 may be synchronized with an on-duration (e.g., the on-duration 623 of FIG. 6) and sleep state (e.g., the DRX sleep 627 of FIG. 6) of the electronic device 101. Accordingly, the LTE BS 340 may wait for transmission of data to be transmitted to the electronic device 101 until the on-duration (e.g., on-duration 623) of the electronic device 101 arrives, and may then transmit the data to be transmitted.

According to various embodiments, in operation 725, a communication processor corresponding to the NR of the electronic device 101 may operate to transmit the transmission data received from the processor 120 (e.g., the AP) to the NR BS 350. According to various embodiments, the integrated communication processor may be implemented to perform operation 725. For example, based on the fact that the amount of transmission data is below a threshold, the electronic device 101 may transmit UL data to the NR BS 350 via a path (or NR-based path) corresponding to the SCG which is the primary path. In operation 727, the electronic device 101 may confirm that the transmission data is transmitted (or scheduled to be transmitted) based on the path corresponding to the SCG. For example, the electronic device 101 may confirm that the transmission data is transmitted (or scheduled to be transmitted) based on the fact that a PDCP entity corresponding to the SCG receives an IP packet (or PDCP SDU) from a processor (e.g., AP). Alternatively, the electronic device 101 may confirm that the transmission data is transmitted (or scheduled to be transmitted) based on at least one of data reception or data output of at least one of an RLC entity, a MAC entity, and a PHY entity corresponding to the SCG. The electronic device 101 may switch a function (or block) of the communication processor corresponding to the LTE or the LTE of the integrated processor to an activated state. The communication processor corresponding to the LTE may receive information indicating transmission of transmission data or dummy transmission information from the communication processor corresponding to the NR. In various embodiments, the communication processor corresponding to the NR may transmit information to the communication processor corresponding to the LTE based on the confirmation of the transmission (or the transmission schedule) of the transmission data. Alternatively, the communication processor corresponding to the NR may transmit information to the communication processor corresponding to the LTE based on the confirmation of the satisfaction of an additional condition. For example, the communication processor corresponding to the NR may transmit information to the communication processor corresponding to the LTE when the communication processor corresponding to the LTE is in the CDRX state. For example, the communication processor corresponding to the NR may transmit information to the communication processor corresponding to the LTE when the transmission data requires a low delay. The communication processor corresponding to the NR may identify whether the transmission data requires a low delay through attribute information of an SCG bearer used for transmission. For another example, when the transmission data does not require the low delay, the NR communication processor may not transmit information to the communication processor (or LTE block) corresponding to the LTE. In this case, the electronic device 101 may not activate the communication processor corresponding to the LTE.

In operation 729, the communication processor or integrated communication processor corresponding to the LTE of the electronic device 101 may transmit designated data (or selected data) through a path corresponding to a MCG, for example, an LTE-based path. The designated data (or designated type of data) or a dummy packet may be data independent from the transmission data. For example, the electronic device 101 may transmit a scheduling request or a buffer state report, but there is no limitation in the designated data as long as the data can be transmitted in the corresponding state of the electronic device 101. In various embodiments, the communication processor or integrated communication processor corresponding to the LTE may be configured to transmit the designated data when the data transmission through the NR-based path is confirmed. Alternatively, the communication processor corresponding to the LTE may be configured to receive the designated data from the communication processor corresponding to the NR and to transmit the received data.

According to various embodiments, in operation 731, the NR BS 350 may transmit the transmission data to the core network 700 (e.g., 330 of FIG. 3A). Under the control of the core network 700, the electronic device 101 may access an external network (e.g., the Internet) and the transmission data may be transmitted to another entity through the external network. Meanwhile, depending on the implementation, the data transmission based on the MCG path of operation 729 may be performed after the transmission of the transmission data of operation 731. Throughout the various embodiments of the disclosure, those skilled in the art will readily understand that a forward/rearward relationship is not defined by the magnitude of the identification code in the flowchart.

According to various embodiments, in operation 733, the LTE BS 340 may be switched from the CDRX state to the activated state. The fact that the LTE BS 340 is switched from the CDRX state to the activated state may mean that the LTE BS 340 does not have a waiting time for data transmission when obtaining data to be transmitted to the electronic device 101. In operation 735, the core network 700 may transmit reception data corresponding to the transmission data to the LTE BS 340. In operation 737, since the LTE BS 340 is out of the CDRX state, the LTE BS 340 may transmit the reception data to the electronic device 101 without waiting. In operation 739, the electronic device 101 may perform an operation based on the reception data. For example, when the reception data is a web browsing screen, the electronic device 101 may display the web browsing screen, but the type of the reception data is not limited. As described above, according to various embodiments, in addition to a condition in which a DL grant is received and a condition in which UL data transmission is scheduled, when a condition in which UL data transmission based on another network communication is performed (or scheduled) is satisfied, a timer (e.g., DRX inactivity timer) may be restarted. In addition, since the monitoring of the PDCCH is constantly performed based on the restart of the timer, the monitoring of the PDCCH may be performed constantly if the condition that UL data transmission is performed (or scheduled) based on the other network communication is satisfied. For example, monitoring may be performed on all subframes.

Figure 8A:
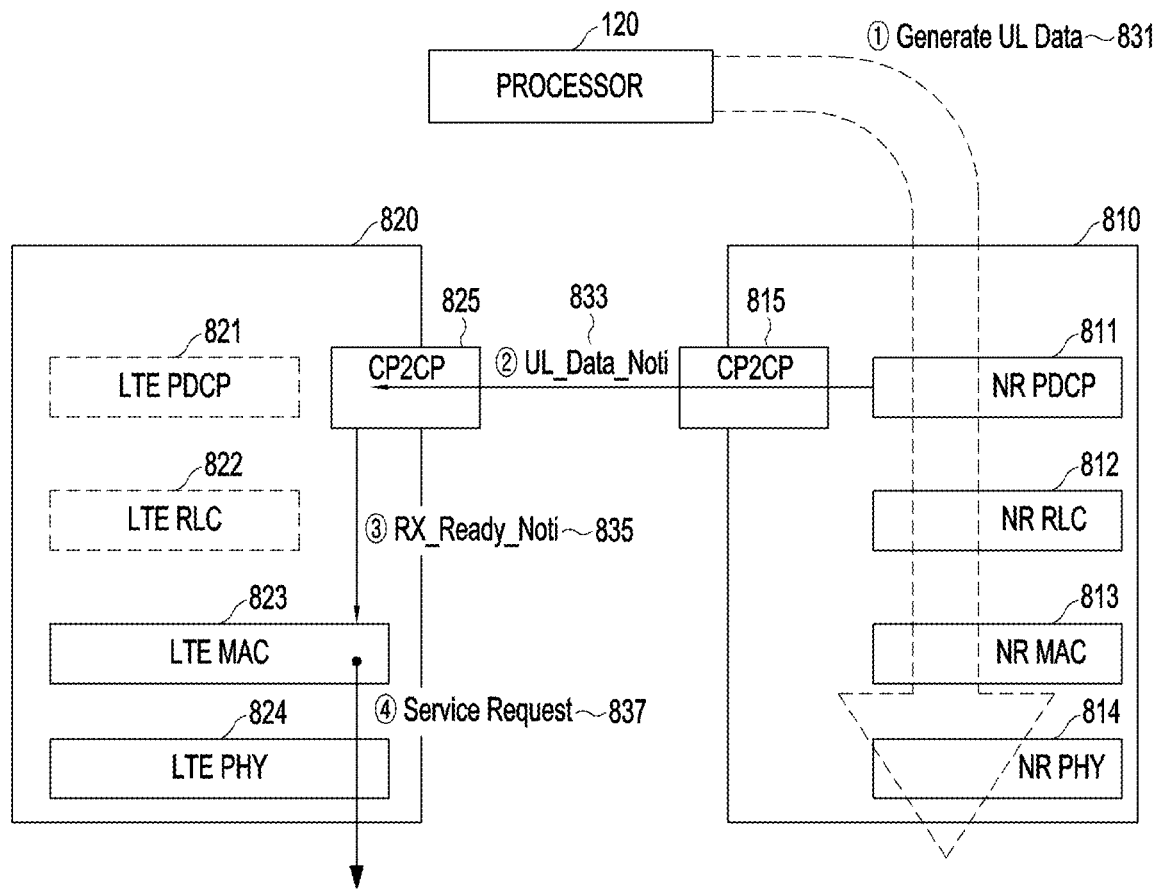
FIG. 8A illustrates a diagram of two communication processor structures according to various embodiments.

FIG. 8A illustrates a diagram of two communication processor structures according to various embodiments.

The processor 120 (e.g., AP) according to various embodiments may generate UL data in operation 831. The processor 120 may transmit the UL data to a communication processor 810 corresponding to an NR. The communication processor 810 corresponding to the NR may be named, for example, an NR modem or a 5G modem. The electronic device 101 may configure an NR-based path as a primary path. Accordingly, when the amount of data to be transmitted is less than a threshold, the UL data may be transmitted to the communication processor 810 corresponding to the NR.

According to various embodiments, an NR PDCP entity 811, an NR RLC entity 812, an NR MAC entity 813, and an NR PHY entity 814 configured (or executed) in the communication processor 810 corresponding to the NR may process and output UL data. Signals based on the UL data processed by the NR PDCP entity 811, the NR RLC entity 812, the NR MAC entity 813, and the NR PHY entity 814 may be output to the outside through, for example, RFIC, RFEE, or antenna. Based on input data (e.g., PDCP SDU (or IP packet)), the NR PDCP entity 811 or the LTE PDCP entity 821 may perform at least one of header compression and decompression (ROHC only), transfer of user data, in-sequence delivery (in-sequence delivery of upper layer PDUs at PDCP re-establishment procedure for RLC AM), reordering (for split bearers in DC (only support for RLC AM): PDCP PDU routing for transmission and PDCP PDU reordering for reception)), duplicate detection (duplicate detection of lower layer SDUs at PDCP re-establishment procedure for RLC AM), retransmission (retransmission of PDCP SDUs at handover and, for split bearers in DC, of PDCP PDUs at PDCP data-recovery procedure, for RLC AM), ciphering and deciphering, or timer-based SDU discard in uplink. Based on input data (e.g., RLC SDU), the NR RLC entity 812 or the LTE RLC entity 822 may perform at least one of transfer of upper layer PDUs, error correction through ARQ (only for AM data transfer), concatenation, segmentation and reassembly of RLC SDUs (only for UM and AM data transfer), re-segmentation of RLC data PDUs (only for AM data transfer), reordering of RLC data PDUs (only for UM and AM data transfer), duplicate detection (only for UM and AM data transfer), protocol error detection (only for AM data transfer), RLC SDU discard (only for UM and AM data transfer), or RLC re-establishment. Based on input data (e.g., MAC SDU), the NR MAC entity 813 or the LTE MAC entity 823 may perform at least one of mapping between logical channels and transport channels, multiplexing/demultiplexing (multiplexing/demultiplexing of MAC SDUs belonging to one or different logical channels into/from transport blocks (TB) delivered to/from the physical layer on transport channels), scheduling information reporting, error correction through HARQ, priority handling between logical channels of one UE, priority handling between UEs by means of dynamic scheduling, MBMS service identification, transport format selection, or padding. The NR PHY entity 814 or the LTE PHY entity 824 may perform channel-coding and modulation on higher layer data, may convert the obtained data into an OFDM symbol, and may transmit the OFDM symbol through a wireless channel. Alternatively, the NR PHY entity 814 or the LTE PHY entity 824 may demodulate the OFDM symbol received through the wireless channel and may perform channel decoding on the obtained data to transmit the resultant data to a higher layer.

According to various embodiments, the NR PDCP entity 811 may transmit UL data notification (UL_data_noti) 833 to the communication processor 820 corresponding to the LTE based on at least one of generation of the UL data, input of the UL data, output after processing of the UL data, or transmission of a communication signal based on the UL data. For example, the UL data notification 833 may be transmitted through a CP2CP transmission module 815 of the communication processor 810 corresponding to the NR and a CP2CP reception module 825 of the communication processor 820 corresponding to the LTE. The UL data notification 833 may be transmitted to the LTE MAC entity 823 via the CP2CP reception module 825. The CP2CP reception module 825 may transmit a reception ready notification (RX_ready_noti) 835 to the LTE MAC entity 823 based on the reception of the UL data notification 833, but in various embodiments, the CP2CP reception module 825 may transmit the UL data notification 833 to the LTE MAC entity 823.

When receiving the reception ready notification 835 (or the UL data notification 833), the LTE MAC entity 823 may transmit a service request 837 to the LTE PHY entity 824 based on whether the LTE MAC entity 823 is in the CDRX state. When the LTE MAC entity 823 is in the CDRX state, the LTE MAC entity 823 may transmit the service request 837 to the LTE PHY entity 824 based on the reception of the reception ready notification 835 (or the UL data notification 833). When the LTE MAC entity 823 is not in the CDRX state, the LTE MAC entity 823 may not transmit the service request 837 to the LTE PHY entity 824 even if it receives the reception ready notification 835 (or the UL data notification 833). As described above, the service request 837 is merely exemplary, and there is no limitation on the type of the designated data transmitted in operation 729 of FIG. 7B described above. The service request 837 may be transmitted to an LTE BS. The LTE BS may exit the CDRX state and may directly transmit data received from the core network to the electronic device 101 without waiting. Accordingly, delay-free DL communication may be possible through an LTE-based path. In various embodiments of the disclosure, the operations of the NR PDCP entity 811, the NR RLC entity 812, the NR MAC entity 813, and the NR PHY entity 814 may be represented as being performed by the communication processor 810 corresponding to the NR, and the operations of the LTE PDCP entity 821, the LTE RLC entity 822, the LTE MAC entity 823, and the LTE PHY entity 824 may be represented as being performed by the communication processor 820 corresponding to the LTE.

Figure 8B:
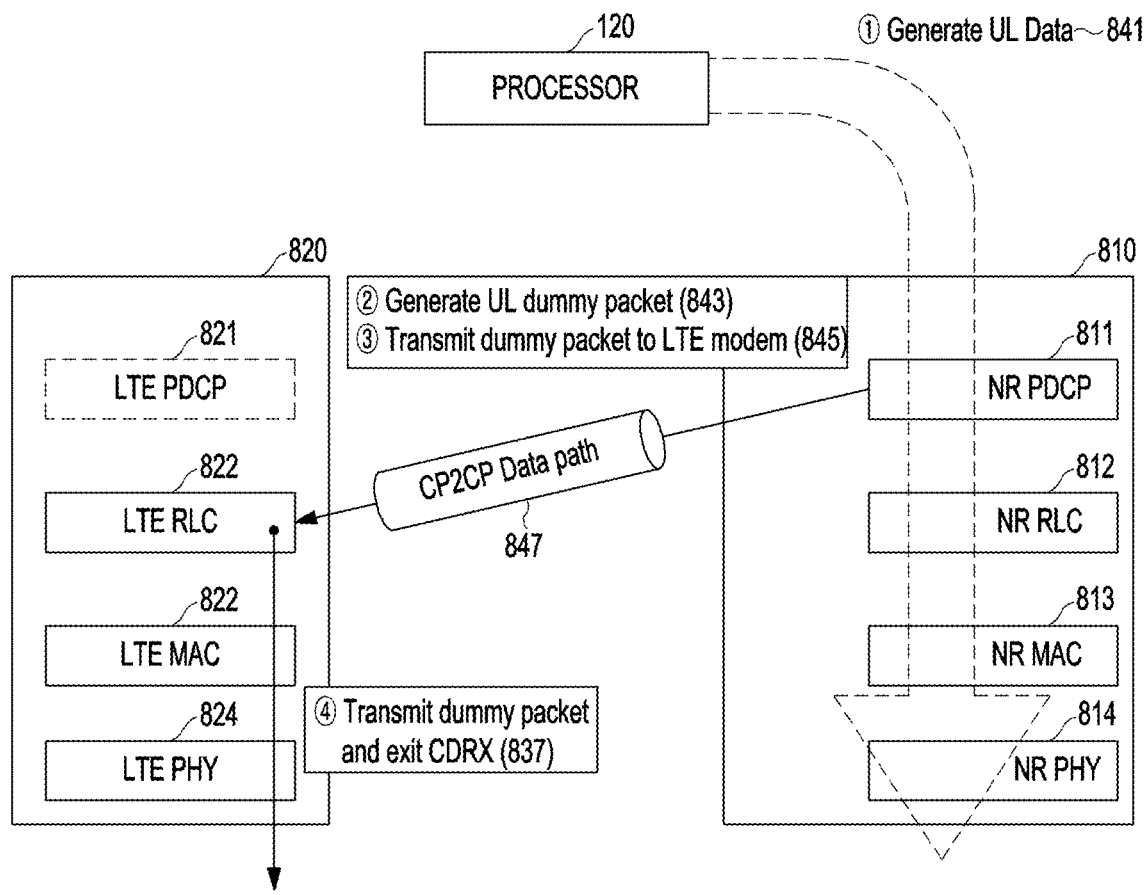
FIG. 8B illustrates a diagram of two communication processor structures according to various embodiments.

FIG. 8B illustrates a diagram of two communication processor structures according to various embodiments.

The processor 120 (e.g., the AP) according to various embodiments may generate UL data in operation 841. The processor 120 may transmit the UL data to the communication processor 810 corresponding to an NR. The electronic device 101 may configure an NR-based path as a primary path. Accordingly, when the amount of data to be transmitted is less than a threshold, the UL data may be transmitted to the communication processor 810 corresponding to the NR.

In operation 843, according to various embodiments, the NR PDCP entity 811 may generate a UL dummy packet based on at least one of generation of the UL data, input of the UL data, output after processing the UL data, or transmission of a communication signal based on the UL data. In operation 845, the NR PDCP entity 811 may transmit the UL dummy packet to the communication processor 820 corresponding to the LTE. For example, the NR PDCP entity 811 may transmit the UL dummy packet to the LTE RLC entity 822 via a CP2CP data path 847. The NR DPCP entity 841 may transmit the UL dummy packet to the LTE RLC entity 822 if a UL data split threshold is not infinity. The LTE RCL entity 822 may transmit the UL dummy packet to the LTE MAC entity 823, and the LTE MAC entity 823 may process the transmitted UL dummy packet and may transmit the processed packet to the LTE PHY entity 824. The UL dummy packet may be transmitted to the LTE BS by the LTE PHY entity 824. The LTE BS may exit the CDRX state and may directly transmit data received from the core network to the electronic device 101 without waiting. Accordingly, delay-free DL communication may be possible through the LTE-based path.

Figure 9A:
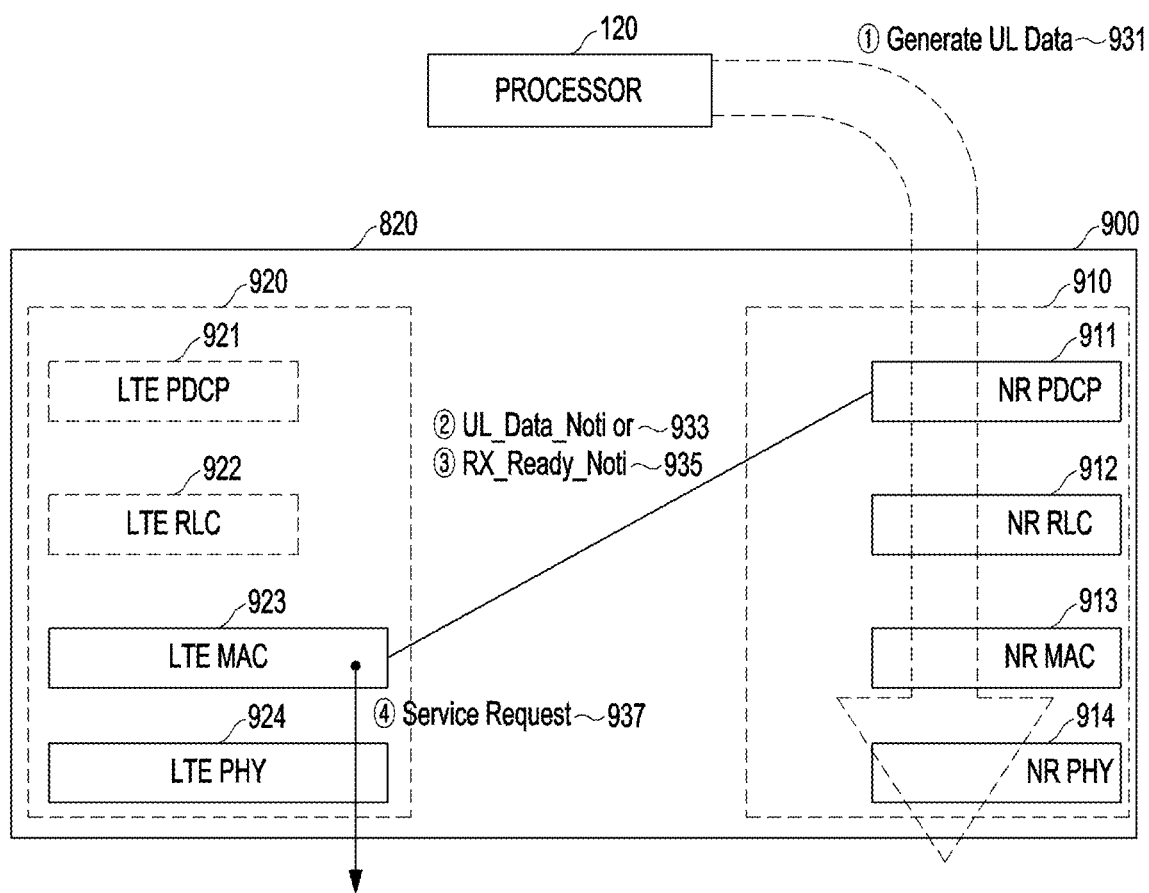
FIG. 9A illustrates a diagram of an integrated communication processor structure according to various embodiments.

FIG. 9A illustrates a diagram of an integrated communication processor structure according to various embodiments.

The processor 120 (e.g., the AP) according to various embodiments may generate UL data in operation 931. The processor 120 may transmit the UL data to an integrated communication processor 900. The integrated communication processor 900 may include an NR block 910 and an LTE block 920. The NR block 910 and the LTE block 920 may be separated in a hardware manner within the integrated communication processor 900 or may be logically separated (e.g., within a protocol stack). In the NR block 910, an NR PDCP entity 911, an NR RLC entity 912, an NR MAC entity 913, and an NR PHY entity 914 may be configured (or executed). The LTE block 920 may include (or configure) an LTE PDCP entity 921, an LTE RLC entity 922, an LTE MAC entity 923, and an LTE PHY entity 924.

According to various embodiments, the electronic device 101 may configure an NR-based path as a primary path. Accordingly, when the amount of data to be transmitted is less than a threshold, UL data may be transmitted to the NR block 910. The NR PDCP entity 911 may transmit an UL data notification (UL_data_noti) 933 or a reception ready notification (RX_ready_noti) 935 to the LTE MAC entity 923. Since it is implemented in one chip, the UL data notification (UL_data_noti) 933 or the reception ready notification (RX_ready_noti) 935 may be transmitted from the NR PDCP entity 911 to the LTE MAC entity 923 without passing through the CP2CP module. The LTE MAC entity 923 may transmit a service request 937 to the LTE PHY entity 924 based on the reception of the UL data notification (UL_data_noti) 933 or the reception ready notification (RX_ready_noti) 935. The service request 937 may be transmitted to the LTE BS. The LTE BS may exit the CDRX state based on the reception of the service request 937, and may transmit data received from the core network to the electronic device 101 without waiting.

Figure 9B:
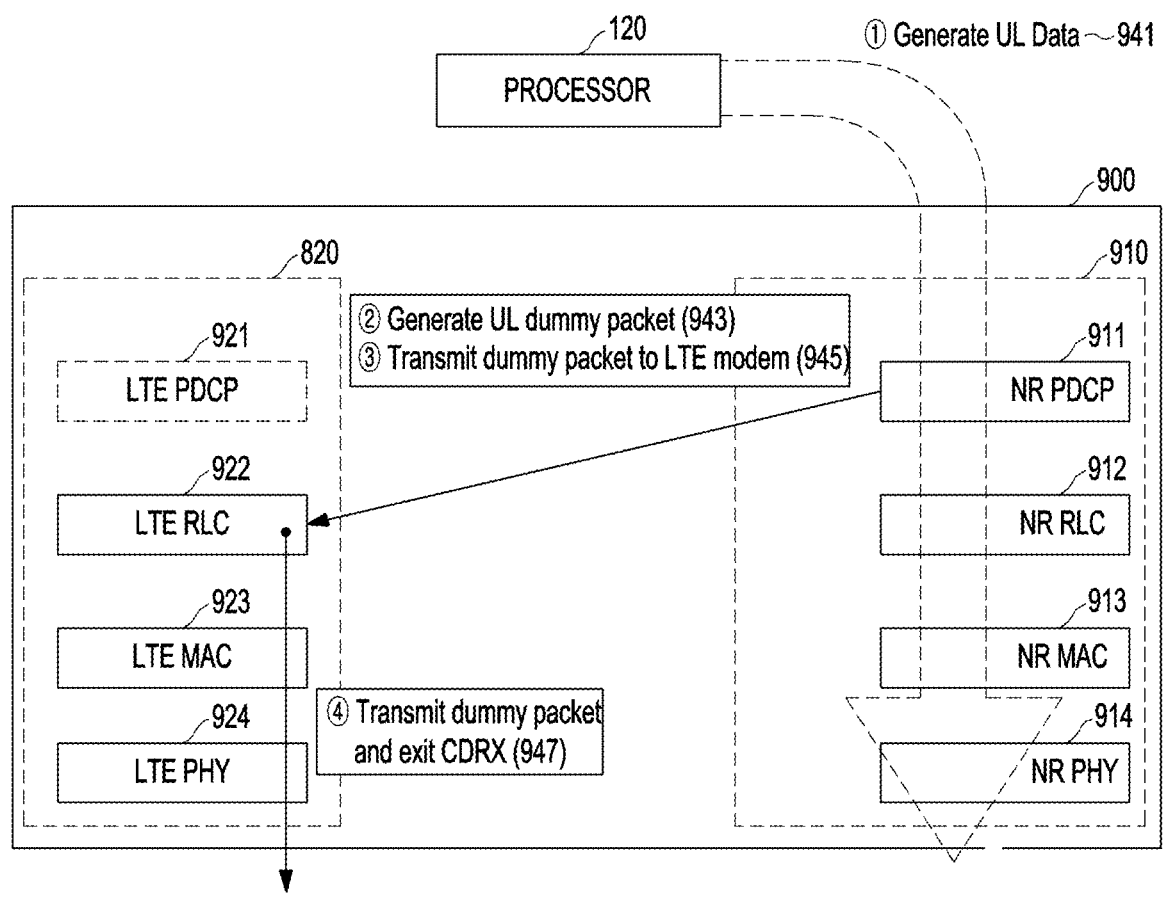
FIG. 9B illustrates a diagram of an integrated communication processor structure according to various embodiments.

FIG. 9B illustrates a diagram of an integrated communication processor structure according to various embodiments.

The processor 120 (e.g., AP) according to various embodiments may generate UL data in operation 941. The processor 120 may transmit the UL data to the integrated communication processor 900. The electronic device 101 may configure an NR-based path as a primary path. Accordingly, when the amount of data to be transmitted is less than a threshold, the UL data may be transmitted to the NR block 910. The NR PDCP entity 911 may generate an UL dummy packet in operation 943. In operation 945, the NR PDCP entity 911 may transmit the UL dummy packet to the LTE RLC entity 922. The LTE RLC entity 922 may output the UL dummy packet in operation 947 and may exit the CDRX. The UL dummy packet may be transmitted to the LTE BS. The LTE RLC entity 922 may output the UL dummy packet if an uplink data split threshold is not infinite. The LTE BS may exit the CDRX state based on the reception of the dummy packet in operation 947, and may transmit data received from the core network to the electronic device 101 without waiting.

Figure 10:
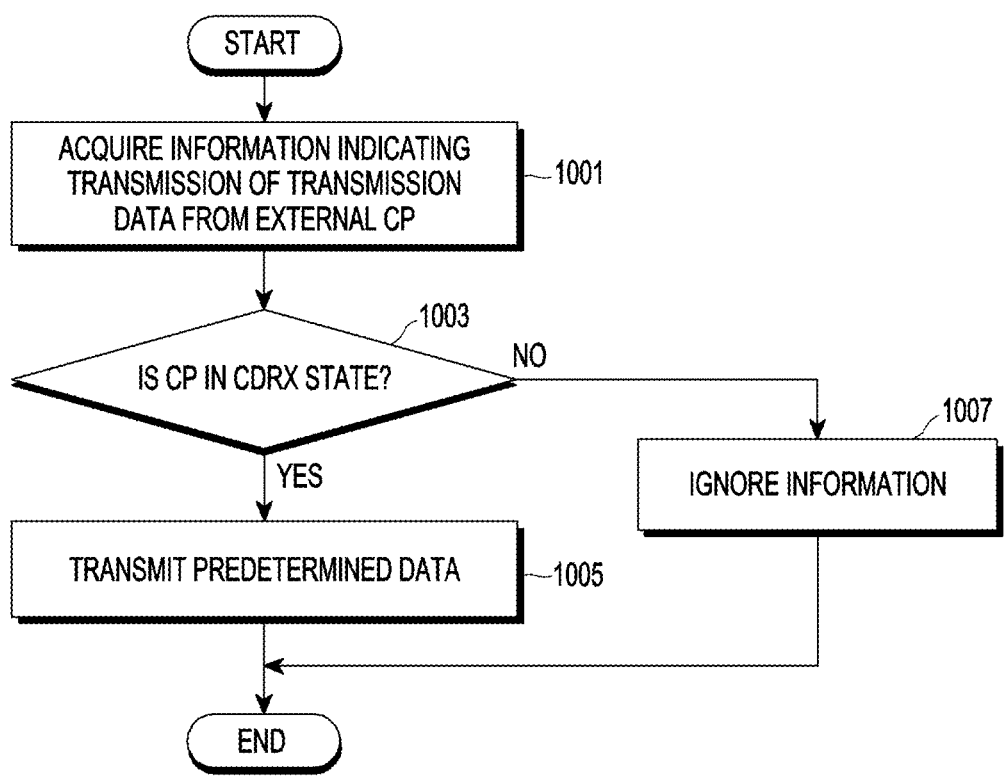
FIG. 10 illustrates a flowchart of a method of operating a communication device according to various embodiments.

FIG. 10 illustrates a flowchart of a method of operating a communication device according to various embodiments.

In operation 1001, a communication processor (e.g., the first communication processor 212 of FIG. 2A) according to various embodiments may acquire information indicating transmission of transmission data from an external communication processor (e.g., the second communication processor 214 of FIG. 2A). Here, the information indicating transmission of the transmission data may be, for example, the UL data notification (UL_data_noti) as in FIG. 8A or the dummy packet as in FIG. 8B generated by the external communication processor. The operations of FIG. 10 may be performed by a communication device including a communication processor. The communication device may include at least one of a communication processor, an RFIC, an RFEE, or an antenna module including at least one antenna. The communication device may include at least one of an LTE communication processor, an RFIC, an RFEE, or an antenna module including at least one antenna. Alternatively, the communication device may include at least one of an NR communication processor, an RFIC, an RFEE, or an antenna module including at least one antenna. When an integrated communication processor (e.g., the integrated communication processor 260 of FIG. 2B) is implemented, one block in the integrated communication processor may acquire the information indicating transmission of the transmission data from another block.

In operation 1003, the communication processor according to various embodiments may identify whether the communication processor is in the CDRX state. The integrated communications processor may identify whether any one of configured blocks is in the CDRX state. For example, the communication processor may identify whether the communication processor is in the CDRX state based on whether a designated timer (e.g., a DRX inactivity timer) has expired or whether the timer is restarted. In the CDRX state, the communication processor may monitor a PDCCH for a designated period (e.g., on-duration), and may be in a sleep state for the other periods. Thus, if a first magnitude of power is consumed by the communication device for the designated period (e.g., on-period) and a second magnitude of power is consumed by the communication device during the sleep state, the first magnitude may be greater than the second magnitude. Even in the case of the integrated communication processor, the magnitude of power consumption when any one block is in the CDRX state may be smaller than power consumption when both blocks are activated.

In operation 1005, according to various embodiments, in the CDRX state (1003—YES), the communication device may transmit predetermined data. For example, the communication device may transmit data, such as a service request or a dummy packet, to a corresponding BS. Accordingly, the BS may exit the CDRX state. The communication device may also exit the CDRX state. The communication device may constantly monitor the PDCCH. In addition, electromagnetic waves corresponding to designated data may be emitted from the antenna of the communication device. In the case of not in the CDRX state (1003—NO), in operation 1007, the communication device may ignore corresponding information. The communication device may maintain the CDRX state and the designated timer may not be restarted. The communication processor of the communication device according to various embodiments may be configured to transmit data designated in response to UL data notification. Alternatively, the communication processor may be configured to transmit the received dummy packet.

Figure 11:
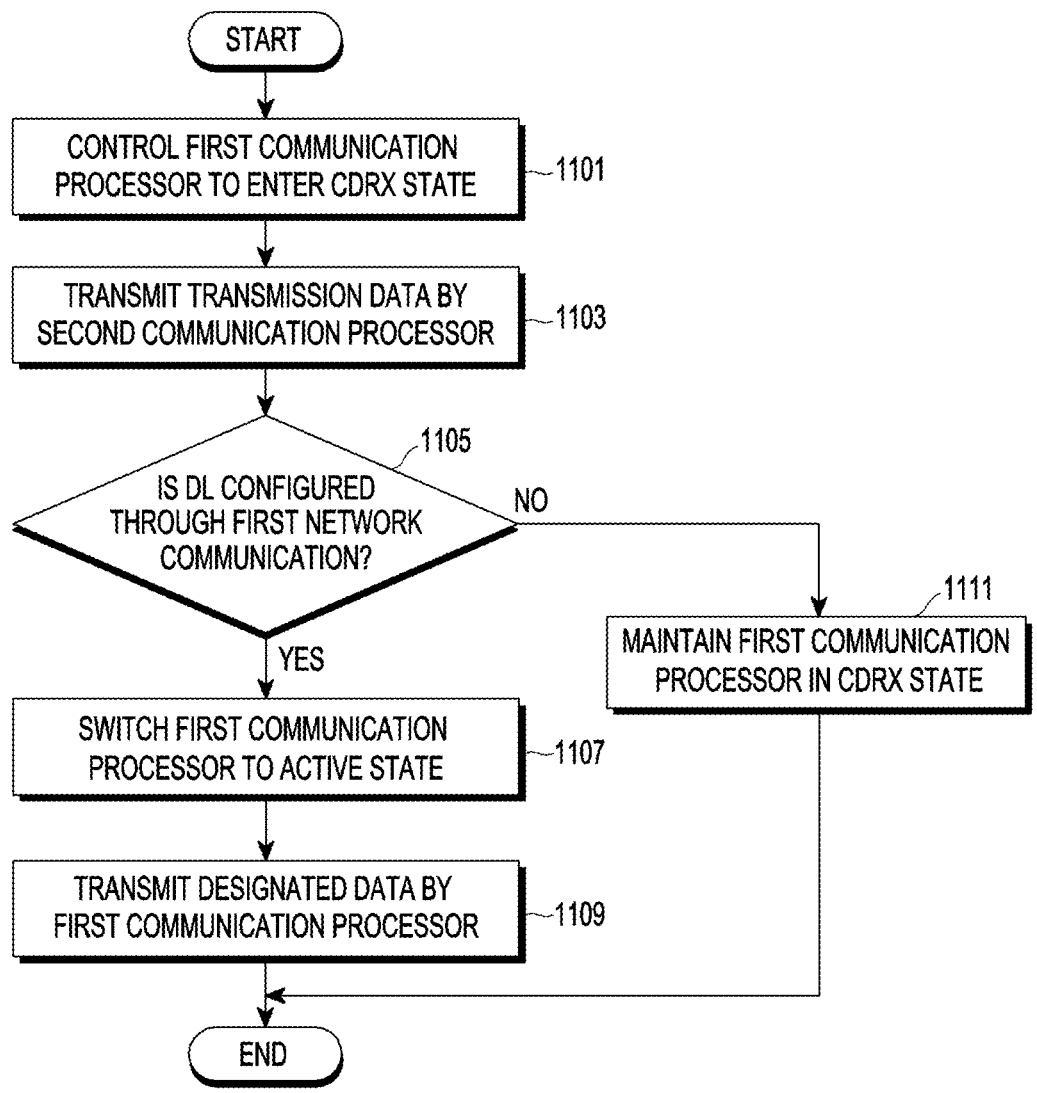
FIG. 11 illustrates a flowchart of a method of operating an electronic device according to various embodiments.

FIG. 11 illustrates a flowchart of a method of operating an electronic device according to various embodiments.

In operation 1101, according to various embodiments, the electronic device 101 may control a first communication processor to enter a CDRX state. For example, the electronic device 101, for example, the first communication processor may control the first communication processor to enter the CDRX state based on the determination of no data transmission and reception during a designated period (e.g., a period corresponding to the number of subframes configured in a DRX inactivity timer). In operation 1103, the electronic device 101 may transmit transmission data by a second communication processor. The electronic device 101 may configure a path based on the second communication processor as a primary path and may transmit the transmission data.

According to various embodiments, in operation 1105, the electronic device 101 may identify whether a DL is configured through first network communication. If the DL is configured through the first network communication (YES of operation 1205), in operation 1107, the electronic device 101 may switch the first communication processor to an activated state. In operation 1109, the electronic device 101 may transmit data designated by the first communication processor to a BS corresponding to the first network communication. Accordingly, the BS may exit the CDRX state. If the DL is not configured through the first network communication (NO of operation 1105), for example, if the DL is configured through second network communication, in operation 1111, the electronic device 101 may maintain the first communication processor to be in the CDRX state. If the second network communication is configured to the DL, since a DL data delay due to the CDRX state of the first network communication does not occur, the first communication processor may be configured to maintain the CDRX state.

Figure 12:
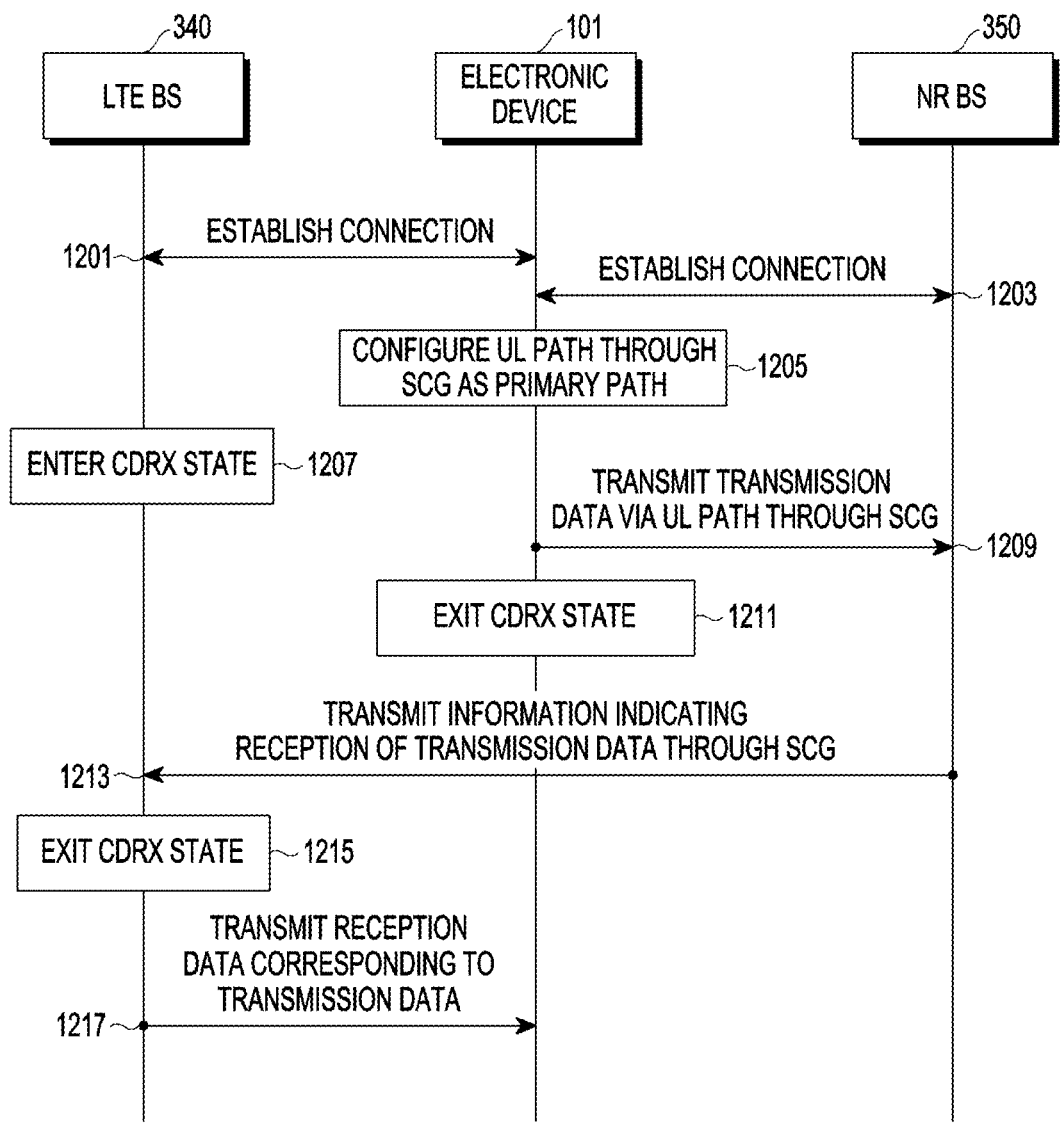
FIG. 12 illustrates a flowchart of the operation of an electronic device, an LTE BS, and an NR BS according to various embodiments.

FIG. 12 illustrates a flowchart of the operation of an electronic device, an LTE BS, and an NR BS according to various embodiments.

According to various embodiment, in operation 1201, the electronic device 101 (e.g., an LTE-based communication processor) may establish a connection with the LTE BS 340. In operation 1203, the electronic device 101 may establish a connection with the NR BS 350. In operation 1205, the electronic device 101 may configure a UL path through an SCG as a primary path. If data is not transmitted or received during a designated period (e.g., DRX inactivity timer) through an MCG-based path, the communication processor corresponding to the LTE may enter the CDRX state. In operation 1207, the LTE BS 340 may enter the CDRX state. For example, the LTE BS 340 may confirm that the electronic device 101 enters the CDRX state. In operation 1209, the electronic device 101 may transmit transmission data to the NR BS 350 through the UL path through the SCG. In operation 1211, based on the transmission of transmission data on the UL path through the SCG, an entity associated with the MCG may exit the CDRX state.

According to various embodiments, in operation 1213, the NR BS 350 may transmit information indicating reception of the transmission data through the SCG to the LTE BS 340. For example, the NR BS 350 may transmit data to the LTE BS 340 through an X2 interface. For example, the NR BS 350 may transmit a control signal for exiting the CDRX state to the LTE BS 340 through an X2-C interface, or may transmit information indicating reception of data from a UE through an X2-U interface. According to various embodiments, in operation 1215, the LTE BS 340 may exit the CDRX state based on data reception from the NR BS 350. For example, the LTE BS 340 may exit the CDRX state based on the reception of a control signal for exiting the CDRX state through the X2-C interface. For example, the LTE BS 340 may exit the CDRX state based on reception of information indicating that data has been received from the UE through the X2-U interface. In operation 1217, the LTE BS 340 may transmit reception data corresponding to the transmission data from the core network to the electronic device 101 without considering a CDRX on duration.

Figure 13:
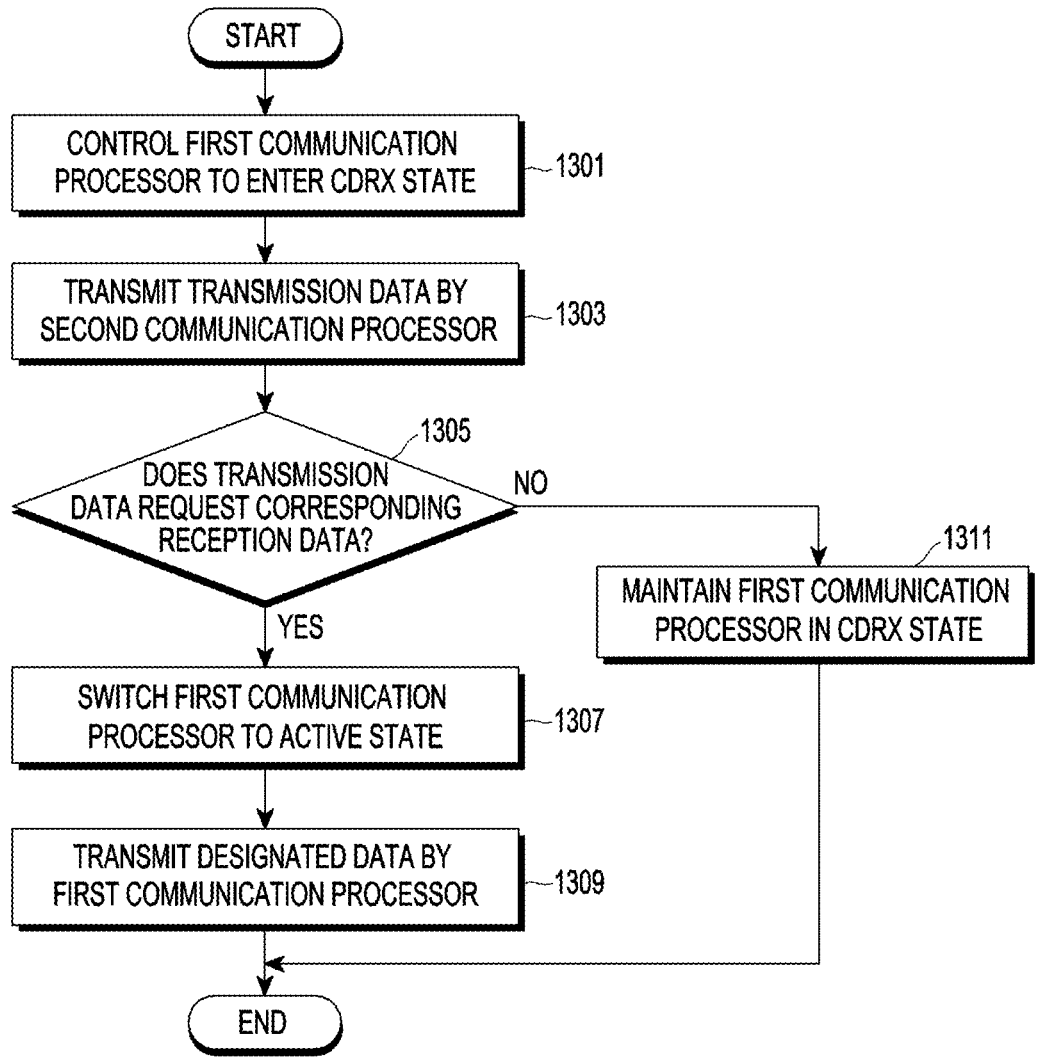
FIG. 13 illustrates a flowchart of a method of operating an electronic device according to various embodiments.

FIG. 13 illustrates a flowchart of a method of operating an electronic device according to various embodiments.

According to various embodiments, in operation 1301, the electronic device 101 may control a first communication processor (e.g., the first communication processor 212 of FIG. 2A) to enter a CDRX state based on satisfaction of a CDRX entry condition. For example, the electronic device 101 may configure a path corresponding to a second communication processor (e.g., the second communication processor 214 of FIG. 2A) as a primary path, and may control the first communication processor to enter the CDRX state based on no transmission and reception of data through the first communication processor during a designated period. In operation 1303, the electronic device 101 may transmit transmission data by the second communication processor while the first communication processor is in the CDRX state.

According to various embodiments, in operation 1305, the electronic device 101 may identify whether the transmission data is data requesting corresponding reception data. For example, the transmission data transmitted by the electronic device 101 to the NR BS 350 may be classified into a type of requesting corresponding data or a type of not requesting corresponding data. When the type of requesting the corresponding data is identified (YES in operation 1305), in operation 1307, the electronic device 101 may switch the first communication processor to an activated state. In operation 1309, the electronic device 101 may transmit data designated by the first communication processor. If the transmission data is identified as the type not requesting the corresponding data (NO in operation 1305), in operation 1311, the electronic device 101 may maintain the first communication processor in the CDRX state. As described above, when it is identified that DL data reception is scheduled, the electronic device 101 may transmit the designated data to the BS while exiting the CDRX state. When it is identified that the DL data reception is not scheduled, the CDRX state may be maintained, so that battery life may be increased while preventing a data reception delay. According to various embodiments, the electronic device 101 may switch the first communication processor to the active state based on whether the corresponding data is transmission data from an application requiring a low delay requirement or whether the corresponding application is executed. Alternatively, the electronic device 101 may switch the first communication processor to the activated state based on whether the corresponding transmission is packet transmission.

According to various embodiments, the electronic device 101 may include a first communication processor (e.g., at least one of the first communication processor 212 or the second communication processor 214 in FIG. 2A) configured to support first network communication with a first network; and a second communication processor (e.g., the other one of the first communication processor 212 or the second communication processor 214 in FIG. 2A) configured to support second network communication with a second network different from the first network. When the first network communication and the second network communication are configured to be in a state of enabling data transmission, the second communication processor (e.g., the other one of the first communication processor 212 or the second communication processor 214) may be configured to transmit transmission data based on the second network communication while the first communication processor (e.g., any one of the first communication processor 212 or the second communication processor 214) is in a CDRX state and to transmit information indicating transmission of the transmission data to the first communication processor (e.g., any one of the first communication processor 212 or the second communication processor 214) and the first communication processor (e.g., any one of the first communication processor 212 or the second communication processor 214) may be configured to switch from the CDRX state to an active state and to transmit data different from the transmission data based on acquisition of the information indicating transmission of the transmission data from the second communication processor (e.g., the other one of the first communication processor 212 or the second communication processor 214).

According to various embodiments, the first communication processor (e.g., any one of the first communication processor 212 or the second communication processor 214) may be further configured to enter the CDRX state when it is identified that the transmission data is not transmitted for a designated period based on a size of the transmission data being less than a threshold, and to monitor a PDCCH based on at least one designated period in the CDRX state.

According to various embodiments, the second communication processor (e.g., the other one of the first communication processor 212 or the second communication processor 214) may be configured to, as at least a part of transmitting the information indicating transmission of the transmission data to the first communication processor (e.g., any one of the first communication processor 212 or the second communication processor 214), transmit designated information corresponding to the transmission of the transmission data to the second communication processor (e.g., the other one of the first communication processor 212 or the second communication processor 214); and, as at least a part of transmitting the data different from the transmission data, transmit data configured to correspond to the designated information as data different from the transmission data.

According to various embodiments, a PDCP entity corresponding to the second network communication may be configured to transmit the designated information based on reception of a PDCP SDU corresponding to the transmission data, the designated information may be received by an MAC entity corresponding to the first network communication, and the data configured to correspond to the designated information may be output by the MAC entity corresponding to the first network communication.

According to various embodiments, the second communication processor (e.g., the other one of the first communication processor 212 or the second communication processor 214) may be configured to, as at least a part of transmitting the information indicating transmission of the transmission data to the first communication processor (e.g., any one of the first communication processor 212 or the second communication processor 214), transmit a designated dummy packet corresponding to the transmission of the transmission data to the second communication processor (e.g., the other one of the first communication processor 212 or the second communication processor 214), and the second communication processor (e.g., the other one of the first communication processor 212 or the second communication processor 214) may be configured to, as at least a part of transmitting the data different from the transmission data, transmit the dummy packet as data different from the transmission data.

According to various embodiments, the PDCP entity corresponding to the second network communication may be configured to transmit the dummy packet based on the reception of the PDCP SDU corresponding to the transmission data, the dummy packet may be received by an RLC entity corresponding to the first network communication, and the dummy packet may be output by the RLC entity corresponding to the first network communication.

According to various embodiments, the first communication processor (e.g., any one of the first communication processor 212 or the second communication processor 214) may be configured to ignore the information indicating the transmission of the transmission data when receiving the information indicating the transmission of the transmission data from the second communication processor (e.g., the other one of the first communication processor 212 or the second communication processor 214) in the active state other than the CDRX state.

According to various embodiments, the first communication processor (e.g., any one of the first communication processor 212 or the second communication processor 214) may be configured to, as at least a part of switching from the CDRX state to the active state based on the information indicating the transmission of the transmission data from the second communication processor (e.g., the other one of the first communication processor 212 or the second communication processor 214) and transmitting the data different from the transmission data, when it is identified that a DL path of the electronic device is a path based on the first network communication, switch from the CDRX state to the active state based on acquisition of the information indicating the transmission of the transmission data from the second communication processor (e.g., the other one of the first communication processor 212 or the second communication processor 214) and transmit the data different from the transmission data.

According to various embodiments, the first communication processor (e.g., any one of the first communication processor 212 or the second communication processor 214) may be configured to, as at least a part of switching from the CDRX state to the active state based on the acquisition of the information indicating the transmission of the transmission data from the second communication processor (e.g., the other one of the first communication processor 212 or the second communication processor 214) and transmitting the data different from the transmission data, when it is identified that the transmission data is data of a type requesting corresponding reception data, switch from the CDRX state to the active state based on the acquisition of the information indicating the transmission of the transmission data from the second communication processor (e.g., the other one of the first communication processor 212 or the second communication processor 214) and transmit the data different from the transmission data.

According to various embodiments, the first communication processor (e.g., any one of the first communication processor 212 or the second communication processor 214) may be further configured to ignore the information indicating the transmission of the transmission data when receiving the information indicating the transmission of the transmission data from the second communication processor (e.g., the other one of the first communication processor 212 or the second communication processor 214) in a case in which it is identified that the transmission data is data of a type not requesting the corresponding reception data.

According to various embodiments, an operation method of an electronic device 101 including a first communication processor (e.g., any one of the first communication processor 212 or the second communication processor 214) configured to support first network communication with a first network; and a second communication processor (e.g., the other one of the first communication processor 212 or the second communication processor 214) configured to support second network communication with a second network different from the first network may include, when the first network communication and the second network communication are configured to be in a state of enabling data transmission, transmitting, by the second communication processor (e.g., the other one of the first communication processor 212 or the second communication processor 214), transmission data based on the second network communication while the first communication processor (e.g., any one of the first communication processor 212 or the second communication processor 214) is in a CDRX state; transmitting, by the second communication processor (e.g., the other one of the first communication processor 212 or the second communication processor 214), information indicating transmission of the transmission data to the first communication processor (e.g., any one of the first communication processor 212 or the second communication processor 214); and switching, by the first communication processor (e.g., any one of the first communication processor 212 or the second communication processor 214), from the CDRX state to an active state and transmitting data different from the transmission data based on acquisition of the information indicating the transmission of the transmission data from the second communication processor (e.g., the other one of the first communication processor 212 or the second communication processor 214).

According to various embodiments, the operation method of the electronic device may further include: entering, by the first communication processor (e.g., any one of the first communication processor 212 or the second communication processor 214), the CDRX state when it is identified that the transmission data is not transmitted for a designated period based on a size of the transmission data being less than a designated threshold; and monitoring a PDCCH based on at least one designated period in the CDRX state.

According to various embodiments, the transmitting of the information indicating the transmission of the transmission data to the first communication processor (e.g., any one of the first communication processor 212 or the second communication processor 214) may include transmitting designated information corresponding to the transmission of the transmission data to the second communication processor (e.g., the other one of the first communication processor 212 or the second communication processor 214), and the transmitting of the data different from the transmission data may include transmitting data configured to correspond to the designated information as the data different from the transmission data.

According to various embodiments, a PDCP entity corresponding to the second network communication may be configured to transmit the designated information based on reception of a PDCP SDU corresponding to the transmission data, the designated information may be received by an MAC entity corresponding to the first network communication, and the data configured to correspond to the designated information may be output by the MAC entity corresponding to the first network communication.

According to various embodiments, the transmitting of the information indicating the transmission of the transmission data to the first communication processor (e.g., any one of the first communication processor 212 or the second communication processor 214) may further include transmitting a designated dummy packet corresponding to the transmission of the transmission data to the second communication processor (e.g., the other one of the first communication processor 212 or the second communication processor 214), and the transmitting of the data different from the transmission data may further include transmitting the dummy packet as the data different from the transmission data.

According to various embodiments, a PDCP entity corresponding to the second network communication may be configured to transmit the dummy packet based on reception of the PDCP SDU corresponding to the transmission data, the dummy packet may be received by an RLC entity corresponding to the first network communication, and the dummy packet may be output by the RLC entity corresponding to the first network communication.

According to various embodiments, the operation method of the electronic device 101 may further include: ignoring, by the first communication processor (e.g., any one of first communication processor 212 or the second communication processor 214), the information indicating the transmission of the transmission data when receiving the information indicating the transmission of the transmission data from the second communication processor (e.g., the other one of the first communication processor 212 or the second communication processor 214) in the active state other than the CDRX state.

According to various embodiments, a communication device configured to support network communication may include: a communication processor (e.g., any one of the first communication processor 212 or the second communication processor 214); at least one RFIC (e.g., at least a portion of at least one of a first RFIC 222, a second RFIC 224, a third RFIC 236, or a fourth RFIC 238) configured to convert and output data transmitted from the communication processor (e.g., any one of the first communication processor 212 or the second communication processor 214) into at least one RF signal; and at least one antenna (e.g., at least a portion of at least one of a first antenna module 242, a second antenna module 244, or a third antenna module 246) configured to receive each of the at least one RF signal and emit an electromagnetic field, wherein the communication processor (e.g., any one of the first communication processor 212 or the second communication processor 214) may be configured to based on a size of the transmission data being less than a designated threshold, transmit the transmission data to the at least one RFIC (e.g., at least a portion of at least one of the first RFIC 222, the second RFIC 224, the third RFIC 236, or the fourth RFIC 238) based on the network communication selected as a primary path, and output information indicating transmission of the transmission data to another communication processor (e.g., the other one of the first communication processor 212 or the second communication processor 214) configured to support another network communication. The at least one RFIC (e.g., at least a portion of at least one of the first RFIC 222, the second RFIC 224, the third RFIC 236, or the fourth RFIC 238) may be configured to transmit the at least one RF signal corresponding to the transmission data to the at least one antenna (e.g., at least a portion of at least one of a first antenna module 242, a second antenna module 244, or a third antenna module 246).

According to various embodiments, a communication device configured to support network communication may include a communication processor (e.g., any one of the first communication processor 212 or the second communication processor 214); at least one RFIC (e.g., at least a portion of at least one of a first RFIC 222, a second RFIC 224, a third RFIC 236, or a fourth RFIC 238) configured to convert data transmitted from the communication processor (e.g., any one of the first communication processor 212 or the second communication processor 214) into at least one RF signal and output the at least one RF signal; and at least one antenna (e.g., at least a portion of at least one of a first antenna module 242, a second antenna module 244, or a third antenna module 246) configured to receive each of the at least one RF signal and emit an electromagnetic field, wherein the communication processor (e.g., any one of the first communication processor 212 or the second communication processor 214) may be configured to enter a CDRX state based on no data transmission and reception for a predetermined time, to switch from the CDRX state to an active state based on reception of information indicating transmission of transmission data from another communication processor in the CDRX state, and to transmit data different from the transmission data to the at least one RFIC (e.g., at least a portion of at least one of the first RFIC 222, the second RFIC 224, the third RFIC 236, or the fourth RFIC 238), and wherein the at least one RFIC (e.g., at least a portion of at least one of the first RFIC 222, the second RFIC 224, the third RFIC 236, or the fourth RFIC 238) may be configured to transmit the at least one RF signal corresponding to the data different from the transmission data to the at least one antenna (e.g., at least a portion of at least one of the first antenna module 242, the second antenna module 244, or the third antenna module 246).

According to various embodiments, a communication device configured to support first network communication with a first network and second network communication with a second network different from the first network may include: a communication processor (e.g., the integrated communication processor 260); at least one first RFIC (e.g., at least a portion of at least one of the first RFIC 222, the second RFIC 224, the third RFIC 236, or the fourth RFIC 238) configured to convert data transmitted from the communication processor (e.g., the integrated communication processor 260) into at least one first RF signal and output the at least one first RF signal; at least one first antenna (e.g., at least a portion of at least one of the first antenna module 242, the second antenna module 244, or the third antenna module 246) configured to receive each of the at least one first RF signal and emit an electromagnetic field; at least one second RFIC (e.g., the other portion of at least one of the first RFIC 222, the second RFIC 224, the third RFIC 236, or the fourth RFIC 238) configured to convert the data transmitted from the communication processor (e.g., the integrated communication processor 260) into at least one second RF signal and output the at least one second RF signal; and at least one second antenna (e.g., the other portion of at least one of the first antenna module 242, the second antenna module 244, or the third antenna module 246) configured to receive each of the at least one second RF signal and emit an electromagnetic field. The communication processor (e.g., the integrated communication processor 260) may be configured to acquire transmission data while the first network communication is configured in a CDRX state, to transmit the transmission data to the at least one second RFIC (e.g., the other portion of at least one of the first RFIC 222, the second RFIC 224, the third RFIC 236, or the fourth RFIC 238), and to transmit data different from the transmission data to the at least one first RFIC (e.g., at least a portion of at least one of the first RFIC 222, the second RFIC 224, the third RFIC 236, or the fourth RFIC 238). The at least one first RFIC (e.g., at least a portion of at least one of the first RFIC 222, the second RFIC 224, the third RFIC 236, or the fourth RFIC 238) may be configured to transmit an RF signal corresponding to the data different from the transmission data to the at least one first antenna (e.g., at least a portion of at least one of the first antenna module 242, the second antenna module 244, or the third antenna module 246). The second RF signal may have a frequency different from the frequency of the at least one first RF signal. The at least one second RFIC (e.g., the other portion of at least one of the first RFIC 222, the second RFIC 224, the third RFIC 236, or the fourth RFIC 238) may transmit the RF signal corresponding to the transmission data to the at least one second antenna (e.g., the other portion of at least one of the first antenna module 242, the second antenna module 244, or the third antenna module 246).

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or task execution device). For example, a processor of the machine (e.g., a master device or a task execution device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first communication processor configured to support first network communication with a first network; and
a second communication processor configured to support second network communication with a second network different from the first network, wherein:
when the first network communication and the second network communication are configured to be in a state of enabling data transmission,
the second communication processor is configured to:
transmit transmission data based on the second network communication while the first communication processor is in a connected mode discontinuous reception (CDRX) state, and
transmit information indicating transmission of the transmission data to the first communication processor; and
the first communication processor is configured to:
switch from the CDRX state to an active state based on acquisition of the information indicating transmission of the transmission data from the second communication processor, and
transmit data different from the transmission data.

2. The electronic device of claim 1, wherein the first communication processor is further configured to:
enter the CDRX state when it is identified that the transmission data is not transmitted for a designated period based on a size of the transmission data being less than a threshold; and
monitor a physical downlink control channel (PDCCH) based on at least one designated period in the CDRX state.

3. The electronic device of claim 1, wherein the second communication processor is configured to:
as at least a part of transmitting the information indicating the transmission of the transmission data to the first communication processor, transmit designated information corresponding to the transmission of the transmission data to the first communication processor; and
as at least a part of transmitting the data different from the transmission data, transmit data configured to correspond to the designated information as the data different from the transmission data.

4. The electronic device of claim 3, wherein:
a packet data convergence protocol (PDCP) entity corresponding to the second network communication is configured to transmit the designated information based on reception of a PDCP service data unit (SDU) corresponding to the transmission data; and
the designated information is received by a medium access control (MAC) entity corresponding to the first network communication, and the data configured to correspond to the designated information is output by the MAC entity corresponding to the first network communication.

5. The electronic device of claim 1, wherein the second communication processor is configured to:
as at least a part of transmitting the information indicating the transmission of the transmission data to the first communication processor, transmit a designated dummy packet corresponding to the transmission of the transmission data to the first communication processor; and
as at least a part of transmitting the data different from the transmission data, transmit the dummy packet as the data different from the transmission data.

6. The electronic device of claim 5, wherein:
a packet data convergence protocol (PDCP) entity corresponding to the second network communication is configured to transmit the dummy packet based on reception of a PDCP service data unit (SDU) corresponding to the transmission data; and
the dummy packet is received by a radio link control (RLC) entity corresponding to the first network communication, and the dummy packet is output by the RLC entity corresponding to the first network communication.

7. The electronic device of claim 1, wherein the first communication processor is configured to:
ignore the information indicating the transmission of the transmission data when receiving the information indicating the transmission of the transmission data from the second communication processor, in the active state other than the CDRX state.

8. The electronic device of claim 1, wherein the first communication processor is configured to:
as at least a part of switching from the CDRX state to the active state based on the acquisition of the information indicating the transmission of the transmission data from the second communication processor and transmitting the data different from the transmission data:
when it is identified that a DL path of the electronic device is a path based on the first network communication, switch from the CDRX state to the active state based on the acquisition of the information indicating the transmission of the transmission data from the second communication processor; and
transmit the data different from the transmission data.

9. The electronic device of claim 1, wherein the first communication processor is configured to:
as at least a part of switching from the CDRX state to the active state based on the acquisition of the information indicating the transmission of the transmission data from the second communication processor and transmitting the data different from the transmission data:
when it is identified that the transmission data is data of a type requesting corresponding reception data, switch from the CDRX state to the active state based on the acquisition of the information indicating the transmission of the transmission data from the second communication processor; and
transmit the data different from the transmission data.

10. The electronic device of claim 9, wherein the first communication processor is further configured to:
ignore the information indicating the transmission of the transmission data when receiving the information indicating the transmission of the transmission data from the second communication processor in a case in which it is identified that the transmission data is data of a type not requesting the corresponding reception data.

11. An operation method of an electronic device including a first communication processor configured to support first network communication with a first network, and a second communication processor configured to support second network communication with a second network different from the first network, the operation method comprising:
when the first network communication and the second network communication are configured to be in a state of enabling data transmission,
transmitting, by the second communication processor, transmission data based on the second network communication while the first communication processor is in a connected mode discontinuous reception (CDRX) state;
transmitting, by the second communication processor, information indicating transmission of the transmission data to the first communication processor; and
switching, by the first communication processor, from the CDRX state to an active state and transmitting data different from the transmission data based on acquisition of the information indicating the transmission of the transmission data from the second communication processor.

12. The operation method of claim 11, further comprising:
entering, by the first communication processor, the CDRX state when it is identified that the transmission data is not transmitted for a designated period based on a size of the transmission data being less than a designated threshold; and
monitoring a physical downlink control channel (PDCCH) based on at least one designated period in the CDRX state.

13. The operation method of claim 11, wherein:
the transmitting of the information indicating the transmission of the transmission data to the first communication processor comprises transmitting designated information corresponding to the transmission of the transmission data to the first communication processor; and
the transmitting of the data different from the transmission data comprises transmitting data configured to correspond to the designated information as the data different from the transmission data.

14. The operation method of claim 13, wherein:
a packet data convergence protocol (PDCP) entity corresponding to the second network communication is configured to transmit the designated information based on reception of a PDCP service data unit (SDU) corresponding to the transmission data; and
the designated information is received by a medium access control (MAC) entity corresponding to the first network communication, and the data configured to correspond to the designated information is output by the MAC entity corresponding to the first network communication.

15. The operation method of claim 11, wherein:
the transmitting of the information indicating the transmission of the transmission data to the first communication processor comprises transmitting a designated dummy packet corresponding to the transmission of the transmission data to the first communication processor; and
the transmitting of the data different from the transmission data further comprises transmitting the dummy packet as the data different from the transmission data.

16. The operation method of claim 15, wherein:
a packet data convergence protocol (PDCP) entity corresponding the second network communication is configured to transmit the dummy packet based on reception of a PDCP service data unit (SDU) corresponding to the transmission data; and
the dummy packet is received by a radio link control (RLC) entity corresponding to the first network communication, and the dummy packet is output by the RLC entity corresponding to the first network communication.

17. The operation method of claim 11, further comprising:
ignoring, by the first communication processor, the information indicating the transmission of the transmission data when receiving the information indicating the transmission of the transmission data from the second communication processor, in the active state other than the CDRX state.

18. A communication device that supports network communication, the communication device comprising:
a communication processor;
at least one radio frequency integrated circuit (RFIC) configured to convert data transmitted from the communication processor into at least one radio frequency RF signal and output the at least one RF signal; and
at least one antenna configured to receive each of the at least one RF signal and emit an electromagnetic field,
wherein the communication processor is configured to:
enter a connected mode discontinuous reception (CDRX) state based on no data transmission and reception for a predetermined time,
switch from the CDRX state to an active state based on reception of information indicating transmission of transmission data from another communication processor in the CDRX state, and
transmit data different from the transmission data to the at least one RFIC, and
wherein the at least one RFIC is configured to transmit the at least one RF signal corresponding to the data different from the transmission data to the at least one antenna.

19. A communication device configured to support first network communication with a first network and second network communication with a second network different from the first network, the communication device comprising:
a communication processor;
at least one first radio frequency integrated circuit (RFIC) configured to convert data transmitted from the communication processor into at least one first radio frequency RF signal and output the at least one first RF signal;
at least one first antenna configured to receive each of the at least one first RF signal and emit an electromagnetic field;
at least one second RFIC configured to convert the data transmitted from the communication processor into at least one second RF signal and output the at least one second RF signal, wherein the second RF signal having a frequency different from the frequency of the at least one first RF signal; and
at least one second antenna configured to receive each of the at least one second RF signal and emit an electromagnetic field,
wherein the communication processor is configured to:
acquire transmission data while the first network communication is configured in a connected mode discontinuous reception (CDRX) state,
transmit the transmission data to the at least one second RFIC, wherein the at least one second RFIC is configured to transmit an RF signal corresponding to the transmission data to the at least one second antenna, and
transmit data different from the transmission data to the at least one first RFIC, and
wherein the at least one first RFIC is configured to transmit an RF signal corresponding to the data different from the transmission data to the at least one first antenna.

* * * * *